(12) United States Patent
Bradway et al.

(10) Patent No.: US 10,704,268 B2
(45) Date of Patent: Jul. 7, 2020

(54) ADHESIVE-BACKED FLOORING PANEL, SYSTEM, AND METHOD

(71) Applicant: Mannington Mills, Inc., Salem, NJ (US)

(72) Inventors: Dennis H. Bradway, Salem, NJ (US); Gregory A. Guynn, Athens, GA (US); Matthew James Moroz, Macon, GA (US)

(73) Assignee: MANNINGTON MILLS, INC., Salem, NJ (US)

( * ) Notice: Subject to any disclaimer, the term of this patent is extended or adjusted under 35 U.S.C. 154(b) by 0 days.

(21) Appl. No.: 15/798,491

(22) Filed: Oct. 31, 2017

(65) Prior Publication Data

US 2018/0127987 A1     May 10, 2018

Related U.S. Application Data

(60) Provisional application No. 62/418,861, filed on Nov. 8, 2016.

(51) Int. Cl.
| | |
|---|---|
| *E04F 15/02* | (2006.01) |
| *C08L 101/00* | (2006.01) |
| *B32B 7/12* | (2006.01) |
| *D06N 7/00* | (2006.01) |
| *D05C 17/02* | (2006.01) |

(52) U.S. Cl.
CPC .......... *E04F 15/02155* (2013.01); *B32B 7/12* (2013.01); *C08L 101/00* (2013.01); *D06N 7/0076* (2013.01); *D06N 7/0081* (2013.01); *B32B 2307/542* (2013.01); *D05C 17/02* (2013.01); *D06N 2203/042* (2013.01); *D06N 2213/065* (2013.01); *D10B 2331/04* (2013.01)

(58) Field of Classification Search
CPC ... E04F 15/02155; E04F 15/0215; B32B 7/12
See application file for complete search history.

(56) References Cited

U.S. PATENT DOCUMENTS

| | | | |
|---|---|---|---|
| 2,887,867 A | 5/1959 | Burchenal et al. | |
| 3,269,994 A | * 8/1966 | Horn | ...................... C09J 133/08 |
| | | | 428/355 AK |
| 3,442,730 A | 5/1969 | Dietz | |
| 3,579,941 A | 5/1971 | Tibbals | |
| 3,627,566 A | 12/1971 | Stichter et al. | |

(Continued)

FOREIGN PATENT DOCUMENTS

| | | |
|---|---|---|
| DE | 3243567 A1 | 6/1983 |
| DE | 19600595 A1 | 7/1997 |

(Continued)

OTHER PUBLICATIONS

International Search Report and Written Opinion issued in corresponding International Patent Application No. PCT/US2017/059154 dated Jan. 31, 2018 (15 pages).

(Continued)

*Primary Examiner* — Brian D Mattei
(74) *Attorney, Agent, or Firm* — Kilyk & Bowersox, P.L.L.C.

(57) ABSTRACT

Adhesive-backed flooring panels, a flooring system including flooring panels, a method of installing flooring panels, a method of manufacturing flooring panels, and a packaged flooring system are provided.

32 Claims, 9 Drawing Sheets

(56) References Cited

U.S. PATENT DOCUMENTS

| | | |
|---|---|---|
| 3,725,122 A | 4/1973 | Reinhard et al. |
| 3,922,454 A | 11/1975 | Roecker |
| 4,151,319 A | 4/1979 | Sackoff et al. |
| 4,172,169 A | 10/1979 | Mawson et al. |
| 4,180,615 A | 12/1979 | Bettoli |
| 4,187,131 A | 2/1980 | Shortway et al. |
| 4,313,866 A | 2/1982 | Renshaw |
| 4,333,987 A | 6/1982 | Kwart et al. |
| 4,393,187 A | 7/1983 | Boba et al. |
| 4,423,178 A | 12/1983 | Renshaw |
| 4,507,188 A | 3/1985 | Chu |
| 4,554,194 A | 11/1985 | Haas et al. |
| 4,614,680 A | 9/1986 | Fry et al. |
| 4,617,210 A | 10/1986 | Zybko |
| 4,647,484 A | 3/1987 | Higgins |
| 4,680,209 A | 7/1987 | Zybko et al. |
| 4,695,493 A | 9/1987 | Friedlander et al. |
| 4,849,267 A | 7/1989 | Ward et al. |
| 4,920,720 A | 5/1990 | LaBianca |
| 5,112,671 A | 5/1992 | Diamond et al. |
| 5,380,794 A | 1/1995 | Schaefer et al. |
| 5,458,953 A | 10/1995 | Wang et al. |
| 5,830,549 A * | 11/1998 | Sweet .................. B32B 21/08 428/40.1 |
| 5,935,668 A | 8/1999 | Smith |
| 5,942,300 A | 8/1999 | Lukowski, Sr. |
| 5,972,148 A | 10/1999 | Lukowski, Sr. |
| 6,001,471 A | 12/1999 | Bries et al. |
| 6,013,342 A | 1/2000 | Neto |
| 6,066,394 A * | 5/2000 | Hoff ..................... C09J 7/245 428/355 AC |
| 6,086,995 A | 7/2000 | Smith |
| 6,106,916 A | 8/2000 | Lukowski, Sr. |
| 6,121,166 A | 9/2000 | Wood et al. |
| 6,180,166 B1 | 1/2001 | Wood et al. |
| 6,291,078 B1 | 9/2001 | Chen et al. |
| 6,357,189 B2 | 3/2002 | Schlisner |
| 6,406,574 B1 | 6/2002 | Hammel et al. |
| 6,457,961 B1 | 10/2002 | Drake, Jr. |
| 6,509,074 B1 | 1/2003 | Wyman |
| 6,586,066 B1 | 7/2003 | Buckwalter et al. |
| 6,767,630 B2 * | 7/2004 | Okuyama ............. B32B 27/08 428/354 |
| 6,828,018 B2 | 12/2004 | Waterbury et al. |
| 6,844,058 B2 | 1/2005 | Blum et al. |
| 6,854,241 B1 | 2/2005 | Pelosi, Jr. |
| 6,878,775 B2 | 4/2005 | Husemann et al. |
| 6,881,793 B2 | 4/2005 | Sheldon et al. |
| 6,966,963 B2 | 11/2005 | O'Connor |
| 7,108,910 B1 | 9/2006 | Smith, Sr. et al. |
| 7,155,871 B1 * | 1/2007 | Stone .................. B32B 27/00 428/189 |
| 7,464,510 B2 | 12/2008 | Scott et al. |
| 7,510,764 B2 | 3/2009 | Husemann et al. |
| 7,810,299 B2 | 10/2010 | Brown et al. |
| 7,993,717 B2 | 8/2011 | O'Connor |
| 8,302,366 B2 | 11/2012 | Taylor et al. |
| 8,468,770 B2 | 6/2013 | McDonald et al. |
| 8,833,028 B2 | 9/2014 | Whispell et al. |
| 9,051,683 B2 | 6/2015 | Brumbelow et al. |
| 9,409,344 B2 | 8/2016 | Schlisner |
| 9,415,565 B2 * | 8/2016 | Ford ..................... C08L 31/04 |
| 9,517,587 B2 | 12/2016 | Schlisner |
| 2002/0081410 A1 * | 6/2002 | Buckwalter ......... A47G 27/0468 428/40.1 |
| 2002/0086176 A1 * | 7/2002 | Brodeur, Jr. ......... A47G 27/0468 428/518 |
| 2006/0032175 A1 | 2/2006 | Chen et al. |
| 2006/0059825 A1 * | 3/2006 | Wiercinski ............... C09J 5/00 52/506.01 |
| 2006/0062955 A1 | 3/2006 | Liu et al. |
| 2006/0156663 A1 * | 7/2006 | Mao ..................... B32B 3/30 52/403.1 |
| 2006/0179751 A1 * | 8/2006 | Wei ..................... E04F 15/10 52/384 |
| 2007/0116931 A1 * | 5/2007 | Lu ....................... B44C 5/0461 428/167 |
| 2007/0196624 A1 | 8/2007 | Chen et al. |
| 2007/0221327 A1 | 9/2007 | Zoller |
| 2008/0213582 A1 | 9/2008 | Schlisner |
| 2009/0031662 A1 | 2/2009 | Chen et al. |
| 2009/0226662 A1 | 9/2009 | Dyczko-Riglin et al. |
| 2010/0223872 A1 | 9/2010 | Taylor et al. |
| 2010/0272943 A1 | 10/2010 | Ddamulira et al. |
| 2011/0167744 A1 * | 7/2011 | Whispell ............... E04F 15/02 52/309.1 |
| 2011/0244230 A1 | 10/2011 | Tsubaki et al. |
| 2012/0011795 A1 | 1/2012 | Pacione et al. |
| 2012/0282459 A1 | 11/2012 | Evans, Jr. et al. |
| 2012/0291387 A1 * | 11/2012 | Keane ................ E04F 15/02038 52/403.1 |
| 2013/0084419 A1 | 4/2013 | Taylor et al. |
| 2013/0089689 A1 | 4/2013 | Liu et al. |
| 2014/0190616 A1 | 7/2014 | Archbold |
| 2014/0342147 A1 * | 11/2014 | Hilgenbrink ............ C04B 41/62 428/335 |
| 2014/0349084 A1 | 11/2014 | Patki et al. |
| 2015/0159324 A1 | 6/2015 | Ikezaki |
| 2016/0122943 A1 | 5/2016 | Brumbelow et al. |
| 2016/0145877 A1 * | 5/2016 | Denman ............... E04F 15/203 52/403.1 |
| 2016/0215506 A1 * | 7/2016 | Sisler ................ E04F 15/02183 |
| 2016/0319170 A1 * | 11/2016 | Zhang ................. E04F 15/0215 |
| 2017/0282510 A1 * | 10/2017 | Peet ....................... B32B 13/02 |
| 2018/0361716 A1 * | 12/2018 | Ackermann ............ B32B 27/08 |
| 2019/0063075 A1 * | 2/2019 | Lautzenhiser ......... E04F 13/0883 |

FOREIGN PATENT DOCUMENTS

| | | |
|---|---|---|
| EP | 1872696 A1 | 2/2008 |
| GB | 1185923 | 3/1970 |
| GB | 1541311 | 2/1979 |
| GB | 2285012 A | 6/1995 |
| JP | 2003286769 A | 10/2003 |
| JP | 2008163562 A | 7/2008 |
| NL | 1000700 | 12/1996 |
| WO | 9856866 | 12/1998 |
| WO | 2007097617 A2 | 8/2007 |

OTHER PUBLICATIONS

Czech et al., "Solvent-free radiation-curable polyacrylate pressure-sensitive adhesive systems." Journal of Applied Polymer Science, Wiley Online Library, vol. 87, Issue 2, 2003 (2 pages).

Goulding, T. M. "Pressure-Sensitive Adhesives," Taylor & Francis Group, LLC, 2003 (16 pages).

* cited by examiner

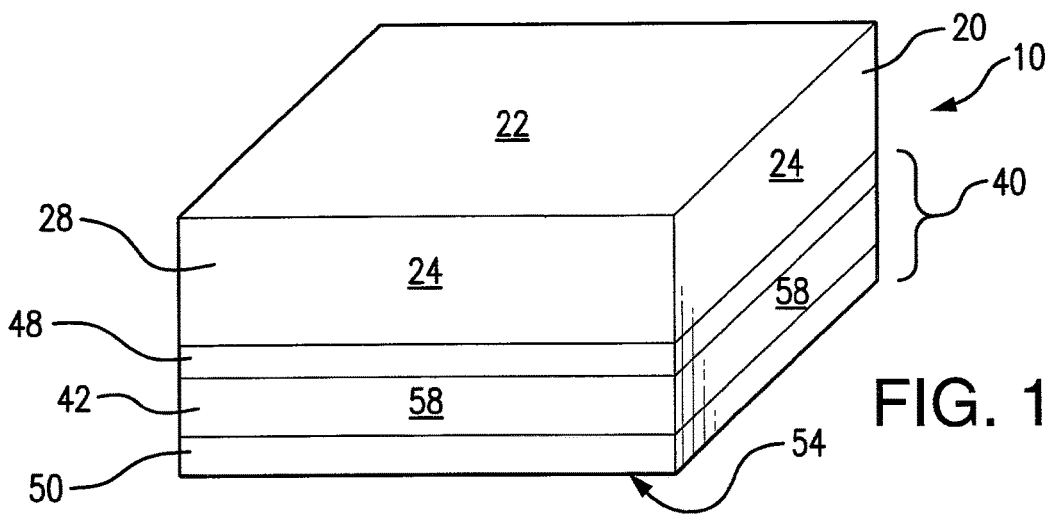
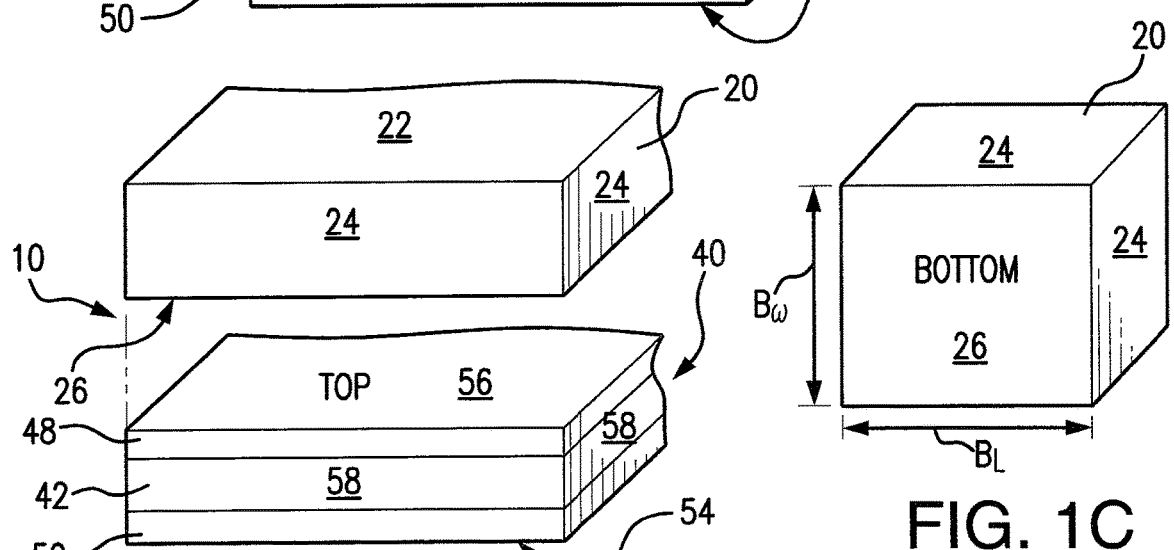
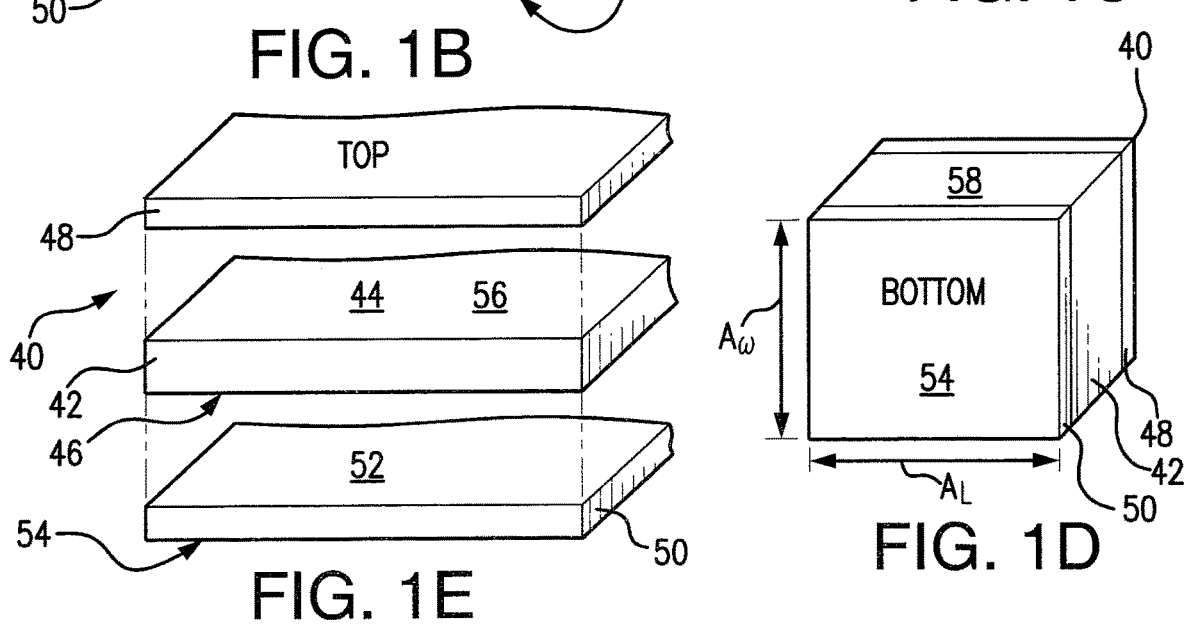

ADHESIVE-BACKED FLOORING PANEL, SYSTEM, AND METHOD

This application claims the benefit under 35 U.S.C. § 119(e) of prior U.S. Provisional Patent Application No. 62/418,861, filed Nov. 8, 2016, which is incorporated in its entirety by reference herein.

BACKGROUND OF THE INVENTION

The present invention relates to adhesive-backed flooring panels, a flooring system including flooring panels, a method of installing flooring panels, a method of manufacturing flooring panels, and a packaged flooring system.

The use of adhesives in flooring products and for flooring installations offers many advantages including the avoidance of more cumbersome or costly fastening hardware and features such as nails, screws, and tongue-and-groove systems. The installation process of using full-spread adhesive, however, is very time consuming, costly, and messy, as well as cumbersome. For instance, an installer has to first remove all oil, dirt, grease, wax, sealers, paint, adhesives, and other substances that would hinder installation. In addition, the subfloor must be level without major pot holes or cracks; the conditions of the subfloor such as moisture content, structure soundness, and the like, also have to be taken care of before the adhesive is applied. On the adhesive part, the proper tools such as trowel type and its size are influential for achieving the best economics and performance. After the adhesive is applied, a proper setting time is required for the adhesive to develop its tackiness before the floor is put down. Any residuals of adhesive oozing up to the surface of the flooring must be quickly removed before they set and adhere to the flooring surface. Furthermore, the cost of the adhesive can be quite expensive. Workers are also expected to have specialized knowledge of adhesive application.

Accordingly, there exists a need for better flooring products, systems, and methods that utilize the advantages of adhesives while avoiding or minimizing their disadvantages.

SUMMARY OF THE PRESENT INVENTION

A feature of the present invention is to provide an adhesive-backed flooring panel that enables the facile installation of the panel including any non-rollable panel.

Another feature of the present invention is to provide an adhesive-backed flooring panel that minimizes or eliminates the need for skilled expertise and/or separate adhesive material for installation of the panel.

A further feature of the present invention is to provide a flooring system that is versatile and easy to install.

An additional feature of the present invention is to provide a method of manufacturing a time-saving adhesive-backed flooring panel.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to an adhesive-backed flooring panel. The flooring panel includes a flooring panel body having a top surface, a bottom surface, and a perimeter edge, and exhibiting a flexural rigidity such that the flooring panel body cannot be rolled-up and the top surface cannot contact the bottom surface. For example, the flooring panel can be in the form of a rigid plank. The flooring panel also includes a double-sided adhesive sheet adhered to and covering the bottom surface of the flooring panel body. The double-sided adhesive sheet includes a base sheet having a first surface and a second surface opposite the first surface, a first adhesive layer adhered to the bottom surface of the flooring panel body and the first surface of the base sheet, and a second adhesive layer having an inner surface and an outer surface opposite the inner surface, wherein the inner surface is adhered to the second surface. The adhesive-backed flooring panel can be provided as a standalone flooring member or can include one or more further components. For example, the adhesive-backed flooring panel can further include a peel-away cover sheet removably attached to the outer surface.

The present invention also relates to a flooring system that can include a plurality of adhesive-backed flooring panels of the present invention, adhered to a substrate. At least two panels of the plurality can be positioned adjacent to one another in a common plane. A slight or pronounced gap can be provided between adjacent panels to allow for decorative grouting, a different type of flooring panel, or the like, to be placed between the adjacent panels. Alternatively, the adjacent panels can contact each other along portions of their respective perimeter edges in a gap-free juxtaposition. A sufficient number of panels can be used to cover a desired floor space and one or more of the flooring panels can be cut to size at a job site.

The present invention further relates to a method of installing a flooring system of the present invention. The method can include installing one or more adhesive-backed flooring panels of the present invention on a substrate, for example, directly on a subfloor or on an underlayer on a subfloor. The method can include providing a plurality of adhesive-backed flooring panels having peel-away cover sheets. A first peel-away cover sheet can be removed from a first adhesive-backed flooring panel of the plurality. The first adhesive-backed flooring panel can then be adhered to the substrate. A second peel-away cover sheet can then be removed from a second adhesive-backed flooring panel of the plurality. The second adhesive-backed flooring panel can then be adhered to the substrate adjacent to the first adhesive-backed flooring panel.

The present invention also relates to a method of manufacturing an adhesive-backed flooring panel of the present invention. The method can include adhering the first adhesive layer of the double-sided adhesive sheet to the bottom surface of the flooring panel body. The double-sided adhesive sheet can include a peel-away cover sheet removably attached to its outer surface. In the absence of a cover sheet, for example, the method can include adhering an underlayer to the outer surface. The method of manufacturing can include cutting the adhesive-backed flooring panel, with or without the cover sheet and/or underlayer, into two or more flooring panels, for example, planks or tiles. The method of manufacturing can be performed using any suitable technique for adhering the double-sided adhesive sheet to the flooring panel body. For example, the adhering can be performed as the flooring panel body travels on a conveyor.

The present invention still further relates to a packaged flooring system. The packaged flooring system can include a package holding a plurality of adhesive-backed flooring panels according to the present invention. The panels can include a removable cover sheet to prevent the panels from adhering to each other in the package. The plurality of panels can be stacked on top of one another and parallel to one another, for example, such that the top surface of one panel is adjacent and parallel to the cover sheet of an adjacent panel.

It is to be understood that both the foregoing general description and the following detailed description are exemplary and explanatory only and intended to provide a further explanation of the present invention, as claimed.

BRIEF DESCRIPTION OF DRAWINGS

FIG. 1A is a right, top perspective view of an adhesive-backed flooring panel of the present invention.

FIG. 1B is in an exploded view of the adhesive-backed flooring panel shown in FIG. 1A with the flooring panel body and double-sided adhesive sheet shown separated from one another.

FIG. 1C is a bottom perspective view of the flooring panel body shown in FIGS. 1A and 1B, with its thickness being exaggerated.

FIG. 1D is a bottom perspective view of the double-sided adhesive sheet shown in FIGS. 1A and 1B.

FIG. 1E is an exploded view of the double-sided adhesive sheet shown in FIGS. 1A and 1B and depicting the first adhesive layer, the base sheet, and the second adhesive layer separated from one another.

DETAILED DESCRIPTION OF THE PRESENT INVENTION

Figure 2:
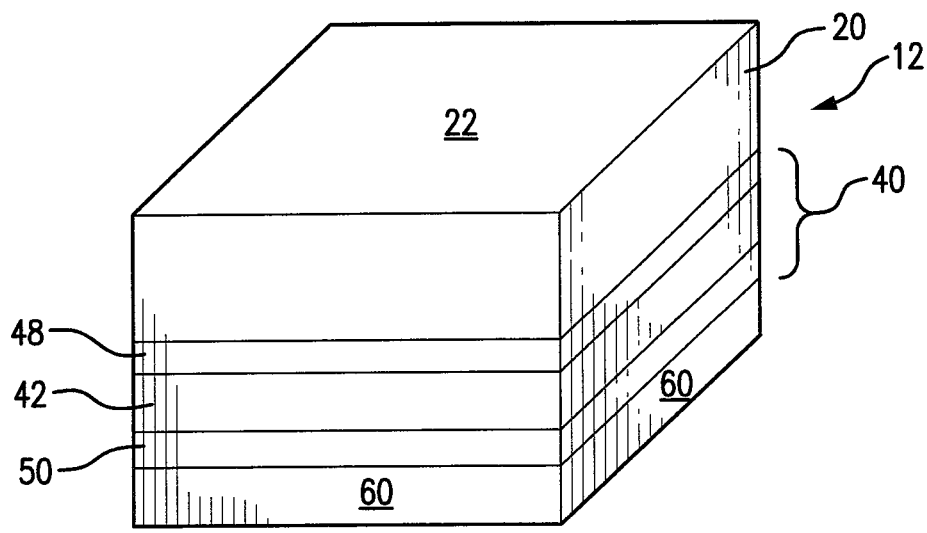
FIG. 2 is a right, top perspective view of another adhesive-backed flooring panel of the present invention, similar to that shown in FIG. 1A, but further including a removable cover sheet.

The present invention relates to an adhesive-backed flooring panel. The flooring panel includes a flooring panel body having a top surface, a bottom surface, and a perimeter edge. The flooring panel exhibits a flexural rigidity such that the flooring panel body cannot be rolled-up and the top surface cannot contact the bottom surface. The flooring panel also includes a double-sided adhesive sheet adhered to and covering the bottom surface of the flooring panel body. The double-sided adhesive sheet includes a base sheet having a first surface and a second surface opposite the first surface, a first adhesive layer adhered to the bottom surface of the flooring panel body and to the first surface of the base sheet, and a second adhesive layer having an inner surface and an outer surface opposite the inner surface, wherein the inner surface is adhered to the second surface of the base sheet.

The adhesive-backed flooring panel can be provided as a standalone flooring member or can include one or more further components. For example, the adhesive-backed flooring panel can further include a peel-away cover sheet removably attached to the outer surface. This cover sheet prevents unwanted adherence of the flooring panel until it is applied to a subfloor or otherwise installed in a desired location. Any suitable material or composition can be used for the cover sheet. For example, the peel-away cover sheet can include a ply-coated kraft liner. Regardless of whether or not a peel-away cover sheet is employed, the outer surface can be adhered to a substrate, for example, a subfloor.

The flooring panel body can have any suitable construction and composition that enables it to exhibit sufficient flexural rigidity such that it cannot be rolled-up. The flooring panel body can be sufficiently rigid that it cannot be bent, curved, or rolled such that the top surface of the body contacts the bottom surface of the body. Attempts to roll up such a flooring panel body, or the resulting flooring panel, would result in damage to the panel body, for example, cracking, crazing, snapping, fracturing, a loss of resiliency, and/or a general loss of structural integrity. Flexural rigidity can be measured using any suitable methodology and calculated using any suitable equation. For example, the following equation (1) can be used:

$$EI\frac{dy}{dx} = \int_0^x M(x)\,dx + C_1, \quad \text{equation (1)}$$

where E is the Young's modulus (in Pascals), I is the second moment of area (in m$^4$), y is the transverse displacement of the beam at x, and M(x) is the bending moment at x. Flexural rigidity has SI units of Pa·m⁴ (which also equals N·m²). This equation can be applied to an adhesive-backed flooring panel or portion thereof.

The double-sided adhesive sheet can cover any portion of the bottom surface of the flooring panel body. The double-sided adhesive sheet can have the same width as the flooring panel body, the same length of the flooring panel body, or both. The double-sided adhesive sheet can cover the entire bottom surface of the flooring panel body. The double-sided adhesive sheet can cover less than 5%, at least 5%, at least 10%, at least 25%, at least 40%, at least 50%, at least 60%, at least 75%, at least 85%, at least 90%, at least 95%, at least 99%, about 100%, or more than 100% of the cross-sectional area of the bottom surface of the flooring panel body. Providing a double-sided adhesive sheet that has a surface area at the first adhesive layer greater than the surface area of the bottom surface of the flooring panel body can assist in joining the panel to other flooring members, to molding, to a transition, or the like. The width of the double-sided adhesive sheet can vary along the length of the flooring panel body. The length of the double-sided adhesive sheet can vary along the width of the flooring panel body.

The double-sided adhesive sheet can be provided in a shape and/or size that matches or that differs from the shape and/or size of the flooring panel body. The double-sided adhesive sheet and/or flooring panel body can be curvilinear, rectilinear, or both. The double-sided adhesive sheet can be positioned symmetrically about a center or other point of the bottom surface of the flooring panel body. The double-sided adhesive sheet can be continuous or discontinuous in shape, for example, a solid body or annulus. The double-sided adhesive sheet can be provided in stripes, crosses, a checkerboard pattern, or the like. The double-sided adhesive sheet can be perforated, scored, or otherwise divided. When a cover sheet is included with the double-sided adhesive sheet and present on the outer surface, the cover sheet can be perforated, scored, or otherwise divided to enable only a portion of the outer surface of the second adhesive layer to be exposed. Regardless of whether or not perforations or similar pre-cut elements are provided, the outside of the cover sheet can be printed with guidelines (ruled or unruled), guide points, shapes, or patterns to aid in the cutting of the flooring pattern during manufacturing or at a job site.

The double-sided adhesive sheet can be provided as a single sheet. Alternatively, two or more double-sided adhesive sheets can be adhered to the bottom surface of the flooring panel body in a non-overlapping and/or overlapping fashion. The two or more double-sided adhesive sheets can have the same kind of construction, base sheet, cover sheet, and/or adhesive compositions, or can differ in one or more different respects, for example, the degree of tackiness. The two or more double-sided adhesive sheets can collectively cover the entire bottom surface of the flooring panel body, a lesser percentage thereof, or a greater percentage thereof, as described herein for a flooring panel having a single double-sided adhesive sheet. The two or more double-sided adhesive sheets can be provided with a common cover sheet or separate cover sheets. Employing separate cover sheets can allow exposure of the outer surface of one double-sided adhesive sheet without exposure of the other.

The base sheet of the double-sided adhesive sheet can have any suitable construction or composition. The base can include one or more layers. The composition of the base sheet can be uniform or non-uniform. The base sheet can be or include a film, a scrim, a web, or any combination thereof. The film, scrim, and/or web can include one or more polymer, rubber, fiberglass, ceramic, wire, textile, and/or other materials sufficient to enable contact with adhesives. For example the base sheet can be or include a polyester film or a scrim. The base sheet can include one or more kinds of polymers. The base sheet can be woven, non-woven, or both. The base sheet can be or include a moisture barrier, for example, a moisture bather material exhibiting a water vapor permeance of 1 perm or less when tested in accordance with ASTM E96. The base sheet can additionally or alternatively include a cushioning layer, a thermal insulating layer, a sound insulating layer, a moisture bather layer, an impact barrier layer, an electrostatic barrier layer, a pest resistant layer, a mold resistant layer, an odor resistant layer, a rigidity layer, a structural reinforcement layer, a magnetic layer, or any combination thereof. The base sheet can have any suitable thickness, for example, a thickness of about 0.5 µm to about 1.0 µm, from about 1.0 µm to about 1.0 cm, from about 10 µm to about 5 mm, from about 50 µm to about 2.5 mm, from about 100 µm to about 0.8 mm, from about 250 µm to about 0.6 mm, from about 500 µm to about 0.7 mm, from about 750 µm to about 1.0 mm, or greater than about 1.0 cm, or any intervening thickness or range of thickness. The base sheet can have uniform or non-uniform thickness. For example, the thickness, surface profile, texture, or the like of the base sheet can be varied to help control thickness, spreading, or adherence of the applied adhesive.

The first surface and second surfaces of the base sheet can be fully or partially covered with one or more adhesives. That is, the first adhesive layer can have the same or different shape and/or size as the first surface of the base sheet, and the second adhesive layer can have the same or different shape and/or size as the second surface of the base sheet. The first and second adhesive layers can have any suitable pattern, density, and/or thickness. The respective compositions of the first and second adhesive layers can be uniform or non-uniform. The first and second adhesive layers can each contain one or more different kinds of adhesives. If more than one kind of adhesive is used in the first and second adhesive layers, the adhesives can be in admixture or can be applied in different regions of the respective first and second surfaces of the base sheet. Distinct cover sheets or a region-specific perforated cover sheet can cover different regions of adhesive of the second adhesive layer. Regions of adhesive can differ with respect to one or more properties, for example, tackiness, drying time, temperature resistance, hygroscopicity, or releasability. The composition and pattern of the second adhesive layer can be tailored to match the properties of an intended substrate to ensure secure adherence.

Any suitable adhesive or combination of adhesives can be used in the first and second adhesive layers. The first adhesive layer, the second adhesive layer, or both, can contain a dry adhesive, a wet adhesive, or both. A synthetic adhesive, natural adhesive, or both can be employed. A reactive adhesive, a non-reactive adhesive, or both can be employed. A dry adhesive, a pressure-sensitive adhesive, a contact adhesive, a hot adhesive, an elastic adhesive, an epoxy resin adhesive, an elastomeric adhesive, a thermoplastic resin adhesive, an instantaneous adhesive, or any combination thereof can be employed. A multi-part or one-part adhesive can be employed. The dry adhesive, for example, can be a solvent-based adhesive or polymer dispersion adhesive (emulsion adhesive). The first adhesive layer and the second adhesive layer can contain the same, similar, or different chemical compositions. For example, the first adhesive layer can be or include an emulsion-modified acrylic plasticizer-resistant adhesive, and the second adhesive layer can be or include an emulsion-modified acrylic solvent-resistant adhesive. Examples of emulsion adhesives include vinyl acetate polymers, such as polyvinyl acetate (PVA) and ethylene vinyl acetate (EVA), acrylics, and styrene-butadiene (SB) latex. Any suitable flooring adhesive can be used. A solvent-resistant adhesive can be used preferentially in the second adhesive layer. The second adhesive layer is below the base sheet after installation and may be more likely to be exposed to water or other solvents compared with the first adhesive layer, which is protected by the base sheet. The adhesive in either or both of the first and second adhesive layers can include a biocide, a stabilizer, a desiccant, or any combination thereof.

The double-sided adhesive sheet can be pre-manufactured as a separate unit, or manufactured in whole or part, layer-by-layer, as part of the overall manufacturing process of the adhesive-backed flooring panel. Any suitable method can be employed for adhesive application, for example, roller coating, gravure roll coating pan coating, press coating, knife coating, bar coating, or any combination thereof. The adhesive can be applied as a liquid, a suspension, a semi-solid, a solid, or any combination thereof. The adhesive can contain additives, for example, particles and/or fibers, to impart or control flow, viscosity, tackiness, flexibility, elasticity, plasticity, strength, and/or other properties to the adhesive and/or the resulting adhesive sheet.

The adhesive can be applied to either side of the base sheet at any suitable thickness, for example, a thickness of from about 0.5 µm to about 1.0 µm, from about 1.0 µm to about 1.0 cm, from about 10 µm to about 5 mm, from about 50 µm to about 2.5 mm, from about 100 µm to about 0.8 mm, from about 250 µm to about 0.6 mm, from about 500 µm to about 0.7 mm, from about 750 µm to about 1.0 mm, or greater than about 1.0 cm, or any intervening thickness or range of thickness. The thickness can be the thickness of the adhesive in the first and/or second adhesive layers when applied, for example, in a wet state, a final thickness after drying, or in any intermediate stage. The thickness of dried adhesive can be from about 1.0% to about 100%, from about 5.0% to about 95%, from about 10% to about 90%, from about 20% to about 80%, from about 25% to about 75%, from about 30% to about 60%, or about 50% of the adhesive thickness when applied before drying. The adhesive can in some cases expand in thickness or other dimensions after application, for example, if applied as a foamable or elastomeric composition. The thickness of the first and/or second adhesive layers can be uniform or non-uniform. The thickness of an adhesive layer can vary, for example, to reflect variations in the thickness, surface profile, texture, or the like of the base sheet.

The adhesive can be applied to either side of the base sheet in any suitable amount per area, for example, in an amount of less than about 0.1 ml/m$^2$, from about 0.1 ml/m$^2$ to about 10 L/m$^2$, from about 1.0 ml/m$^2$ to about 5.0 L/m$^2$, from about 10 ml/m$^2$ to about 1 L/m$^2$, from about 0.1 L/m$^2$ to about 0.9 L/m$^2$, from about 0.25 L/m$^2$ to about 0.75 L/m$^2$, from about 0.4 L/m$^2$ to about 0.6 L/m$^2$, or greater than about 10 L/m$^2$, or any intervening amount or range. The adhesive can be applied to either side of the base sheet in any suitable amount per area, for example, in an amount of less than about 1.0 g/m$^2$, from about 1.0 g/m$^2$ to about 1.0 kg/m$^2$, from about 10 g/m$^2$ to about 0.8 kg/m$^2$, from about 25 g/m$^2$ to about 0.6 kg/m$^2$, from about 50 g/m$^2$ to about 0.5 kg/m$^2$, from about 0.1 kg/m$^2$ to about 0.3 kg/m$^2$, or greater than about 1.0 kg/m$^2$, or any intervening amount or range.

An underlayer (underlay, underlaying, underlayment, pad, or the like) can form part of the adhesive-backed flooring panel or can be added to the adhesive-backed flooring panel. The underlayer can be positioned between the flooring panel body and the double-sided adhesive sheet, or the double-sided adhesive sheet can be between the flooring panel body and the underlayer. For example, the bottom surface of the flooring panel body can include a body proper and an underlayer between the body proper and the double-sided adhesive sheet. Alternatively, or additionally, the adhesive-backed flooring can include an underlayer attached to the outer surface of the second adhesive layer. Any suitable underlayer can be employed. For example, the underlayer can be or include a cushioning layer, a thermal insulating layer, a sound insulating layer, a moisture barrier layer, an impact barrier layer, an electrostatic bather layer, a pest resistant layer, a mold resistant layer, an odor resistant layer, a rigidity layer, a structural reinforcement layer, a magnetic layer, a floating floor engagement layer, a radiant heat engagement layer, a utility access engagement layer, or any combination thereof. Such properties can alternatively or additionally be incorporated into the base sheet of the double-sided adhesive sheet or one or both of the adhesive layers.

FIG. 1A is a right, top perspective view of a first adhesive-backed flooring panel 10 of the present invention. FIG. 1B is an exploded view of adhesive-backed flooring panel 10 shown in FIG. 1A with a flooring panel body 20 and a double-sided adhesive sheet 40 shown separated from one another. FIG. 1C is a bottom perspective view of flooring panel body 20 shown in FIGS. 1A and 1B. FIG. 1D is a bottom perspective view of double-sided adhesive sheet 40 shown in FIGS. 1A and 1B. FIG. 1E is an exploded view of double-sided adhesive sheet 40 shown in FIGS. 1A and 1B showing a first adhesive layer 48, a base sheet 42, and a second adhesive layer 50 separated from one another.

Adhesive-backed flooring panel 10 can include at least flooring panel body 20 and double-sided adhesive sheet 40. Adhesive-backed flooring panel 10 is shown having a rectangular shape for illustrative purposes only and can have any desirable shape or size. For illustrative purposes only, flooring panel body 20 and double-sided adhesive sheet 40 are shown having similar and very exaggerated thicknesses. In actuality, although either member can have any desired thickness, the thickness of double-sided adhesive sheet 40 is generally considerably less than the thickness of flooring panel body 20.

Flooring panel body 20 has a top surface 22, a perimeter edge 24, and a bottom surface 26. Flooring panel body 20 can also be taken as having a "body proper" 28 distinct from the surfaces and edges. Double-sided adhesive sheet 40 includes base sheet 42 having a first surface 44 and a second surface 46 opposite first surface 44. Double-sided adhesive sheet 40 further includes first adhesive layer 48 and second adhesive layer 50 on and adhered to first and second surfaces 44, 46, respectively. First adhesive layer 48 is also on and adhered to bottom surface 26 through an adhesive sheet interface surface 56. Second adhesive layer 50 has an inner surface 52 and an outer surface 54 opposite inner surface 52. Double-sided adhesive sheet 40 has an adhesive sheet perimeter edge 58. For illustrative purposes only, perimeter edge 24 of flooring panel body 20 is shown to be coextensive with adhesive sheet perimeter edge 58. Similarly, flooring panel body 20 is shown having a body width $B_W$ and a body length $B_L$ equal to adhesive sheet width $A_W$ and adhesive sheet length $A_L$, however, the widths and/or lengths can differ from one another.

Figure 3:
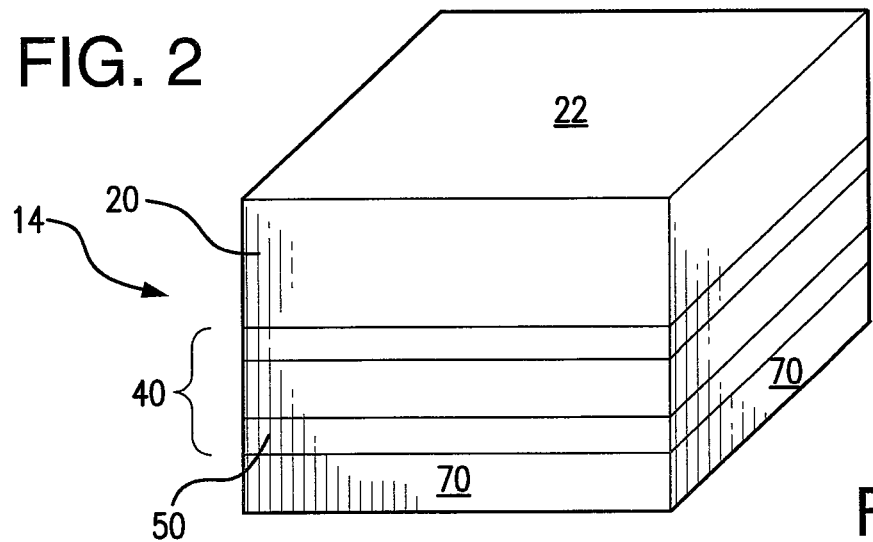
FIG. 3 is a right, top perspective view of still another adhesive-backed flooring panel of the present invention, similar to that shown in FIG. 1A, but further including an underlayer below the double-sided adhesive sheet.
Figure 4:
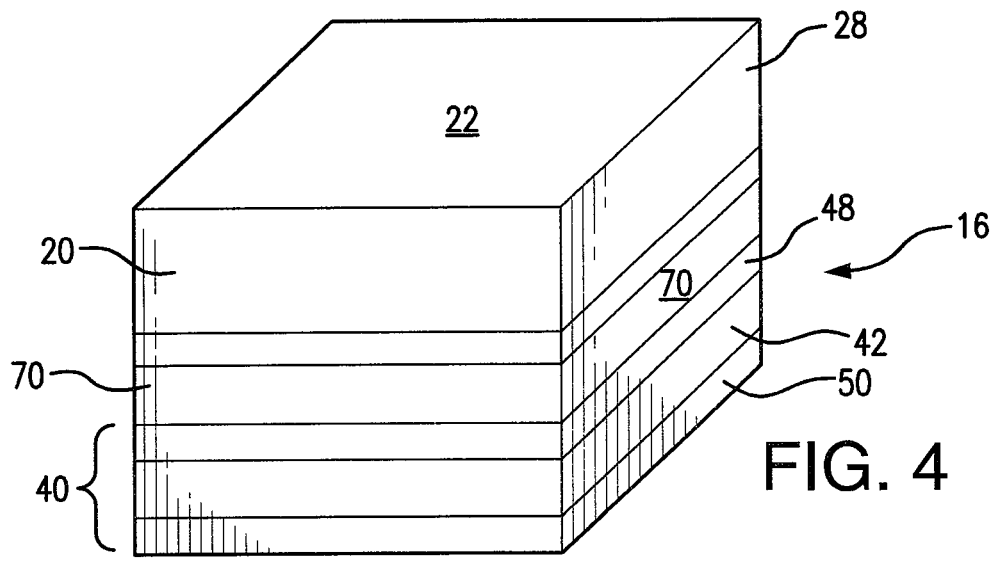
FIG. 4 is a right, top perspective view of yet another adhesive-backed flooring panel of the present invention, similar to that shown in FIG. 1A, but further including an underlayer between the flooring panel body proper and the double-sided adhesive sheet.

FIG. 2 is a right, top perspective view of another adhesive-backed flooring panel 12 of the present invention, similar to adhesive-backed flooring panel 10 shown in FIG. 1A, but further including a removable cover sheet 60 adhered to outer surface 54 of second adhesive layer 50. FIG. 3 is a right, top perspective view of still another adhesive-backed flooring panel 14 of the present invention, similar to adhesive-backed flooring panel 10 shown in FIG. 1A, but further including an underlayer 70 below double-sided adhesive sheet 40, adhered to outer surface 54 of second adhesive layer 50. FIG. 4 is a right, top perspective view of yet another adhesive-backed flooring panel 16 of the present invention, similar to adhesive-backed flooring panel 10 shown in FIG. 1A, but further including underlayer 70 between flooring panel body proper 28 and double-sided adhesive sheet 40. Adhesive-backed flooring panels 14 and 16 can also include a cover sheet (not shown), for example, in the manner shown in FIG. 2.

Figure 11A:
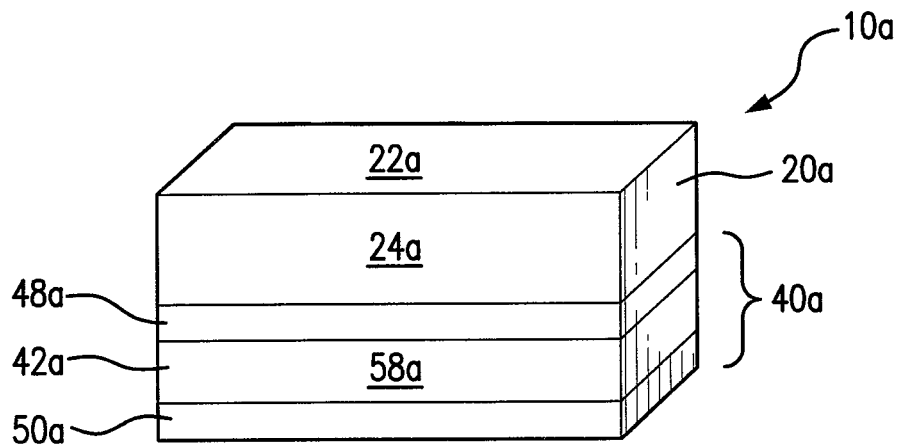
FIG. 11A is a right, top perspective view of an adhesive-backed flooring plank of the present invention, representing a portion of the adhesive-backed flooring panel shown in FIG. 1A.
Figure 11B:
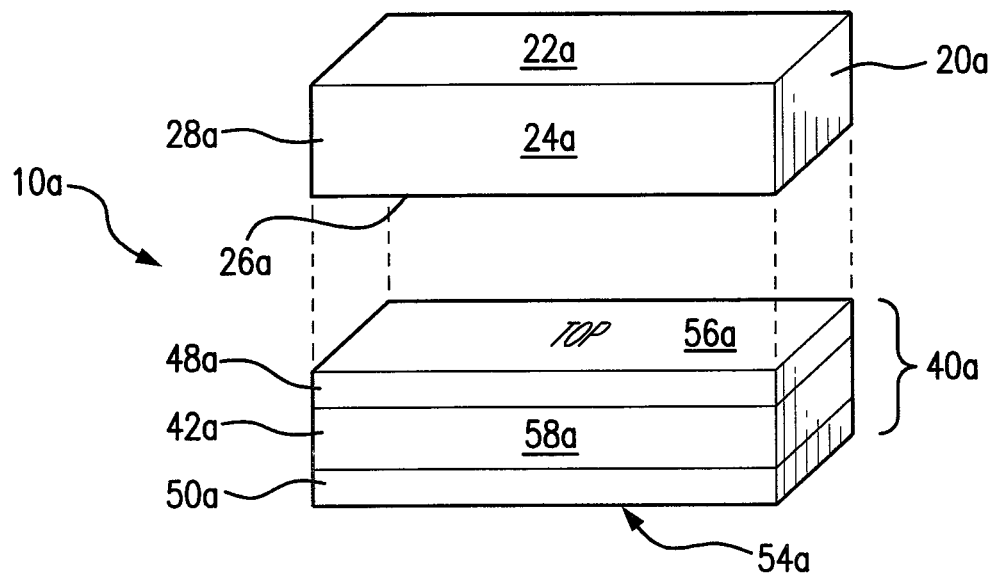
FIG. 11B is in an exploded view of the adhesive-backed flooring plank shown in FIG. 11A with the flooring plank body and double-sided adhesive sheet portion shown separated from one another.
Figure 11C:
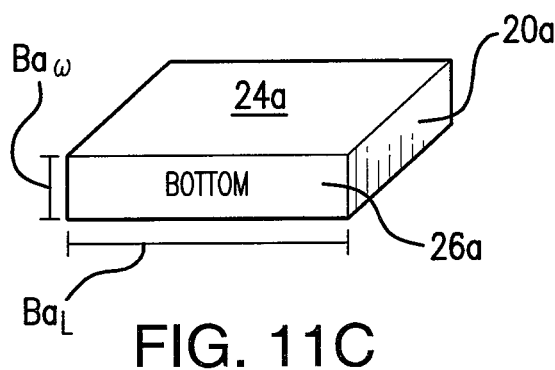
FIG. 11C is a bottom perspective view of the flooring plank body shown in FIGS. 11A and 11B.
Figure 11D:
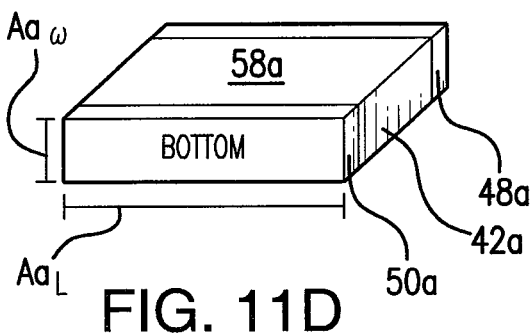
FIG. 11D is a bottom perspective view of the double-sided adhesive sheet portion shown in FIGS. 11A and 11B.

A first adhesive-backed flooring plank 10a can be formed from a portion of adhesive-backed flooring panel 10. Apart from overall dimensions, an adhesive-backed flooring plank of the present invention can have properties similar or the same as that of an adhesive-backed flooring panel of the present invention. FIG. 11A is a right, top perspective view of first adhesive-backed flooring plank 10a of the present invention. FIG. 11B is an exploded view of adhesive-backed flooring plank 10a shown in FIG. 11A with a flooring plank body 20a and a double-sided adhesive sheet portion 40a shown separated from one another. FIG. 11C is a bottom perspective view of flooring plank body 20a shown in FIGS. 11A and 11B. FIG. 11D is a bottom perspective view of double-sided adhesive sheet portion 40a shown in FIGS. 11A and 11B.

Adhesive-backed flooring plank 10a can include at least flooring plank body 20a and double-sided adhesive sheet portion 40a. Adhesive-backed flooring plank 10a is shown having a rectangular shape for illustrative purposes only and can have any desirable shape or size. For illustrative purposes only, flooring plank body 20a and double-sided adhesive sheet portion 40a are shown having similar thicknesses. In actuality, although either member can have any desired thickness, the thickness of double-sided adhesive sheet portion 40a is generally considerably less than the thickness of flooring plank body 20a.

Flooring plank body 20a has a top surface 22a, a perimeter edge 24a, and a bottom surface 26a. Flooring plank body 20a can also be taken as having a "body proper" 28a distinct from the surfaces and edges. Double-sided adhesive sheet portion 40a includes a base sheet portion 42a having a first surface and a second surface opposite the first surface. Double-sided adhesive sheet portion 40a further includes first adhesive layer portion 48a and a second adhesive layer portion 50a on and adhered to the first and second surfaces, respectively. First adhesive layer portion 48a is also on and adhered to bottom surface 26a through an adhesive sheet interface surface 56a. Second adhesive layer portion 50a has an inner surface, not visible, and an outer surface 54a opposite the inner surface. Double-sided adhesive sheet portion 40a has an adhesive sheet perimeter edge 58a. For illustrative purposes only, perimeter edge 24a of flooring plank body 20a is shown to be coextensive with adhesive sheet perimeter edge 58a. Similarly, flooring plank body 20a is shown having a body width $Ba_W$ and a body length $Ba_L$ equal to adhesive sheet width $Aa_W$ and adhesive sheet length $Aa_L$, however, the widths and/or lengths can differ from one another. A comparison of FIGS. 1C and 1D with FIGS. 11C and 11D demonstrates that the adhesive sheet portion can cover the entirety of the bottom surface of the flooring plank body even after being cut from an adhesive-backed flooring panel.

The adhesive-backed flooring panels and planks of the present invention can be manufactured using any suitable method. Accordingly, a method of manufacturing an adhesive-backed flooring panel of the present invention is also provided. The method can include adhering the first adhesive layer of the double-sided adhesive sheet to the bottom surface of the flooring panel body. The double-sided adhesive sheet can include a peel-away cover sheet removably attached to the outer surface. In the absence of a cover sheet, for example, the method can include adhering an underlayer to the outer surface. Thus, the method can further include adhering an underlayer to the outer surface, wherein the underlayer has an upper surface and a lower surface, the upper surface adjacent to the outer surface. An outer double-sided adhesive sheet can optionally be adhered to the lower surface of the underlayer. This process can be repeated to build up any desired number or thicknesses of underlayers.

The method of manufacturing can include cutting the adhesive-backed flooring panel, with or without the cover sheet and/or underlayer, into two or more flooring panel portions. The cutting can be performed, for example, after the adhering of the first adhesive sheet layer. An initially large rectangular flooring panel, for example, can be cut into smaller planks, tiles, or other panel units. The bottom surfaces of the individual bodies of the resulting panel portions can also be covered by portions of the original double-sided adhesive sheet by virtue of the double-sided adhesive sheet having covered the bottom surface of flooring panel before the flooring panel was cut.

The method of manufacturing can be performed using any suitable technique for adhering the double-sided adhesive sheet to the flooring panel body. For example, the adhering can be performed as the flooring panel body travels on a conveyor. Any desired number of flooring panel bodies can be traveling along the conveyor at any given time. For example, a second flooring panel body can follow a first flooring panel body on the conveyor. A first adhesive layer of a second double-sided adhesive sheet can be adhered to a bottom surface of the second flooring panel body. The double-sided adhesive sheet can be applied as an individualized pre-cut sheet or provided from a roll or accordion-type sheet pile. For example, the double-sided adhesive sheet and second double-sided adhesive sheet can be supplied from a source double-side adhesive sheet having an area sufficient to cover the bottom surfaces of the first flooring panel body and the second flooring panel body. The leading edge of the double-sided adhesive sheet can be applied (adhered) first to the leading edge of the bottom surface of the first flooring panel body. A wave of adherence can continue in a direction opposite the direction traveled by the flooring panel body until the double-sided adhesive sheet meets the trailing edge of the first flooring panel body. The method can include cutting the source double-sided adhesive sheet at or proximal a trailing edge of the first flooring panel body. The new leading edge of the source double-sided sheet can be applied to the leading edge of the next flooring panel body on the conveyor. This process can be repeated for applying the double-sided adhesive sheet to as many flooring panel bodies as desired. Other techniques of applying the double-sided adhesive sheet to a flooring panel body include, for example, a stamp press that pushes the double-sided adhesive sheet on to the bottom surface of the flooring panel body and cuts the sheet to match the dimensions of the panel body.

Figure 7:
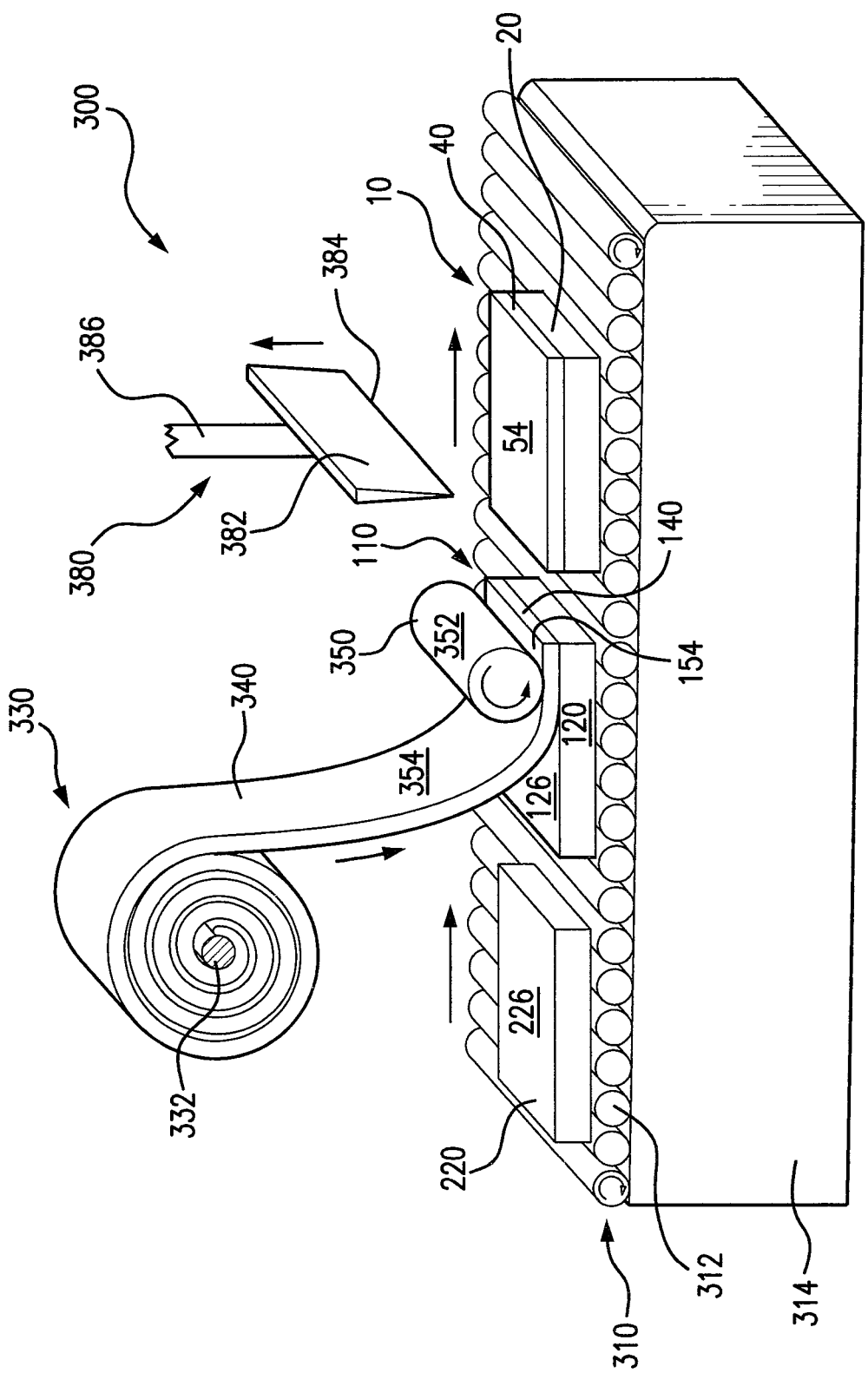
FIG. 7 is a perspective view of a first apparatus and depicts how an adhesive-backed flooring panel can be manufactured according to the present invention and shows the application of the double-sided adhesive sheet on to the flooring panel body.

FIG. 7 is a perspective view of a first apparatus 300 that depicts how adhesive-backed flooring panels 10, 110, and 210 can be manufactured according to the present invention. FIG. 7 shows the application of the double-sided adhesive sheet onto the respective flooring panel bodies 20, 120, and 220. Flooring panel bodies 20, 120, and 220 travel top-surface-down along a conveyor 310. Conveyor 310 is shown including a plurality of conveyor rollers 312 held by a conveyor housing 314. Although flooring panel bodies 20, 120, and 220 are shown directly contacting plurality of rollers 312, such a depiction is for illustrative purposes only. Other types of conveyors can alternatively or additionally be employed, for example, which include one or more moving belts or sheets or screens or tables. Adhesive-backed flooring panel 10 is shown as the leading panel and has already been completed at this stage as illustrated, having had double-sided adhesive sheet 40 applied to flooring panel body 20. Double-sided adhesive sheet 40 has been cut and formed from a source double-sided adhesive sheet 340 using cutting subsystem 380. Source double-sided adhesive sheet 340 can be held and supplied from a double-sided adhesive sheet roll 330 on a sheet roll mandrel 332. Source double-sided adhesive sheet 340 can include, although not shown in FIG. 7, a cover sheet such as cover sheet 60 shown in FIG. 2. Cutting subsystem 380 can include a knife 382 having a blade 384 and can be raised and lowered using a shaft 386. Double-sided adhesive sheet roll 330, sheet roll mandrel 332, and cutting subsystem 380 can optionally be held in a frame attached to or otherwise positioned in relation to conveyor 310. A pressure roller 350 has a pressure roller surface 352 and is shown helping to guide and press source double-sided adhesive sheet 340 on to second bottom surface 126 of second flooring panel body 120 to begin to form second double-sided adhesive sheet 140 of second flooring panel 110. Pressure roller surface 352 can have a non-stick or stick-resistant coating to help prevent source double-sided adhesive sheet 340 from sticking to it although no such properties are required if a coversheet is included on sheet 340. Cutting subsystem 380 can cut source double-sided adhesive sheet 340 once application of second double-sided adhesive sheet 140 is complete. The process can continue to form any desired number of flooring panels. After adhesive-backed flooring panel 110 is formed, adhesive-backed flooring panel 210 is formed by application of source double-sided adhesive sheet 340 to bottom surface 226 of third flooring panel body 220. One or more additional rollers can be employed to aid in tensioning of source double-sided adhesive sheet 340. First apparatus 300, as well as a method of using the apparatus, are aspects of the present invention.

Figure 8:
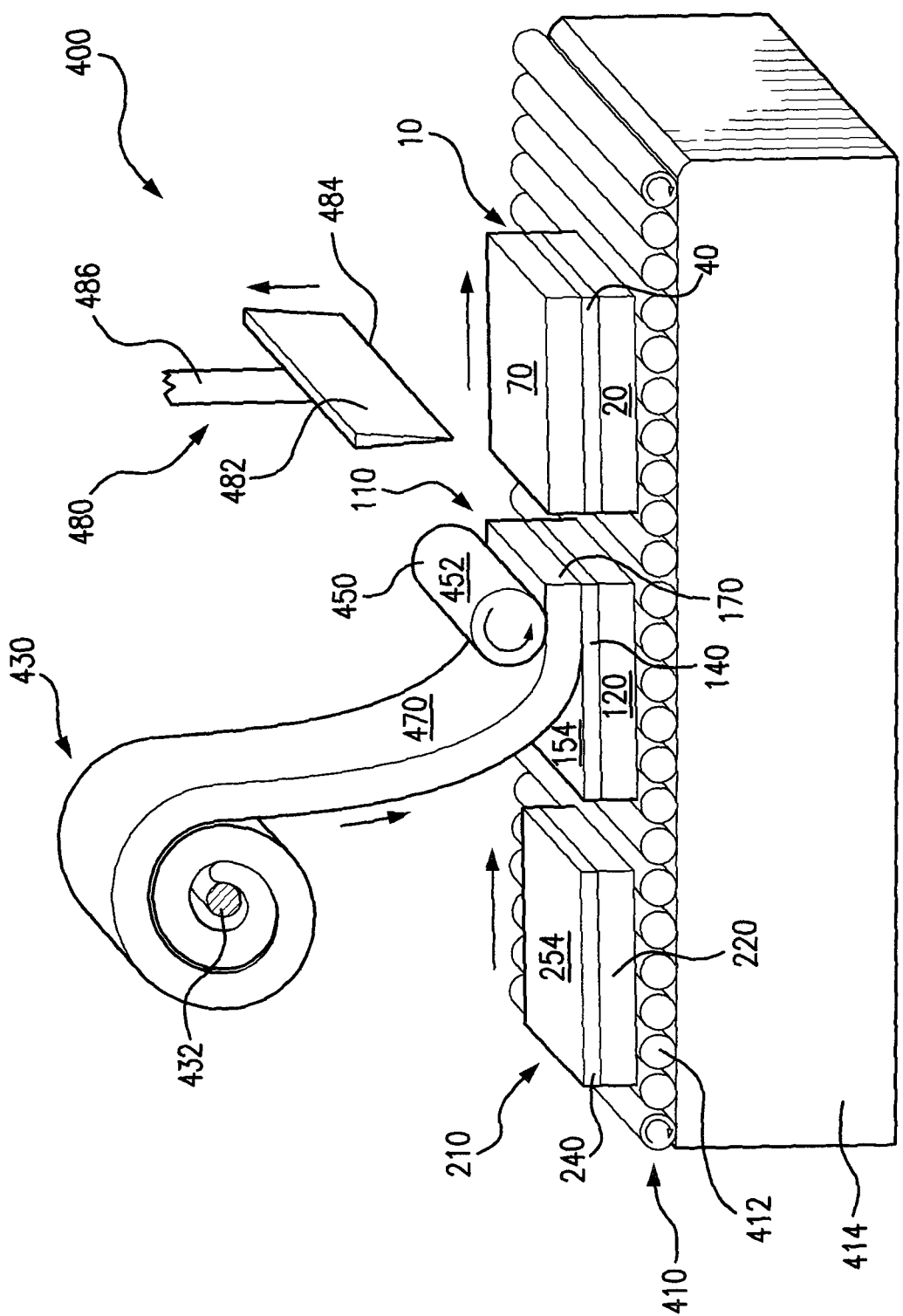
FIG. 8 is a perspective view of a second apparatus and depicts how an adhesive-backed flooring panel can be manufactured according to the present invention and shows the application of an underlayer onto the double-sided adhesive sheet that has already been applied to the flooring panel body.

FIG. 8 is a perspective view of a second apparatus 400 that depicts how an adhesive-backed flooring panel can be manufactured according to the present invention and shows the application of an underlayer 70 onto the double-sided adhesive sheet 40 that has already been applied to the flooring panel body 20. Second apparatus 400 can be a continuation of first apparatus 300, a reconfiguration (switching of a double-sided adhesive sheet roll to an underlayer roll) of first apparatus 300, or a standalone unit. Second apparatus 400 can include a second conveyor 410, a plurality of second conveyor rollers 412, and a second conveyor housing 414, similar or identical to conveyor 310 and its components. Second apparatus 400 also can include an underlayer roll 430 on an underlayer mandrel 432 configured to supply a source underlayer 470 for application to outer surface 154 of second flooring panel 110. Second pressure roller 450 having a second pressure roller surface 452 helps press source underlayer 470 onto outer surface 154 to form second underlayer 170. Second apparatus 400 can also include a second cutting system 480 analogous to cutting system 380. Second cutting subsystem 480 can include a knife 482 having a blade 484 and can be raised and lowered using a shaft 486. Underlay roll 430, underlayer mandrel 432, and second cutting subsystem 480 can optionally be held in a frame attached to or otherwise positioned in relation to conveyor 410. Second cutting subsystem 480 can cut source underlayer 470 once application of second underlayer 170 is complete. The process can continue to form any desired number of flooring panels with underlayers. After adhesive-backed flooring panel 110 is formed with underlayer 410, source underlayer 470 is applied to outer surface 254 of third flooring panel 210. Once underlayers have been added, the flooring panels can be sent through first apparatus 300 again to add a second double-sided adhesive sheet to the bottom of the underlayer, for example, the second double-sided adhesive sheet can include a cover layer if no further layers are to be added before packaging. Second apparatus 400, as well as a method of using the apparatus, are aspects of the present invention.

Figure 9:
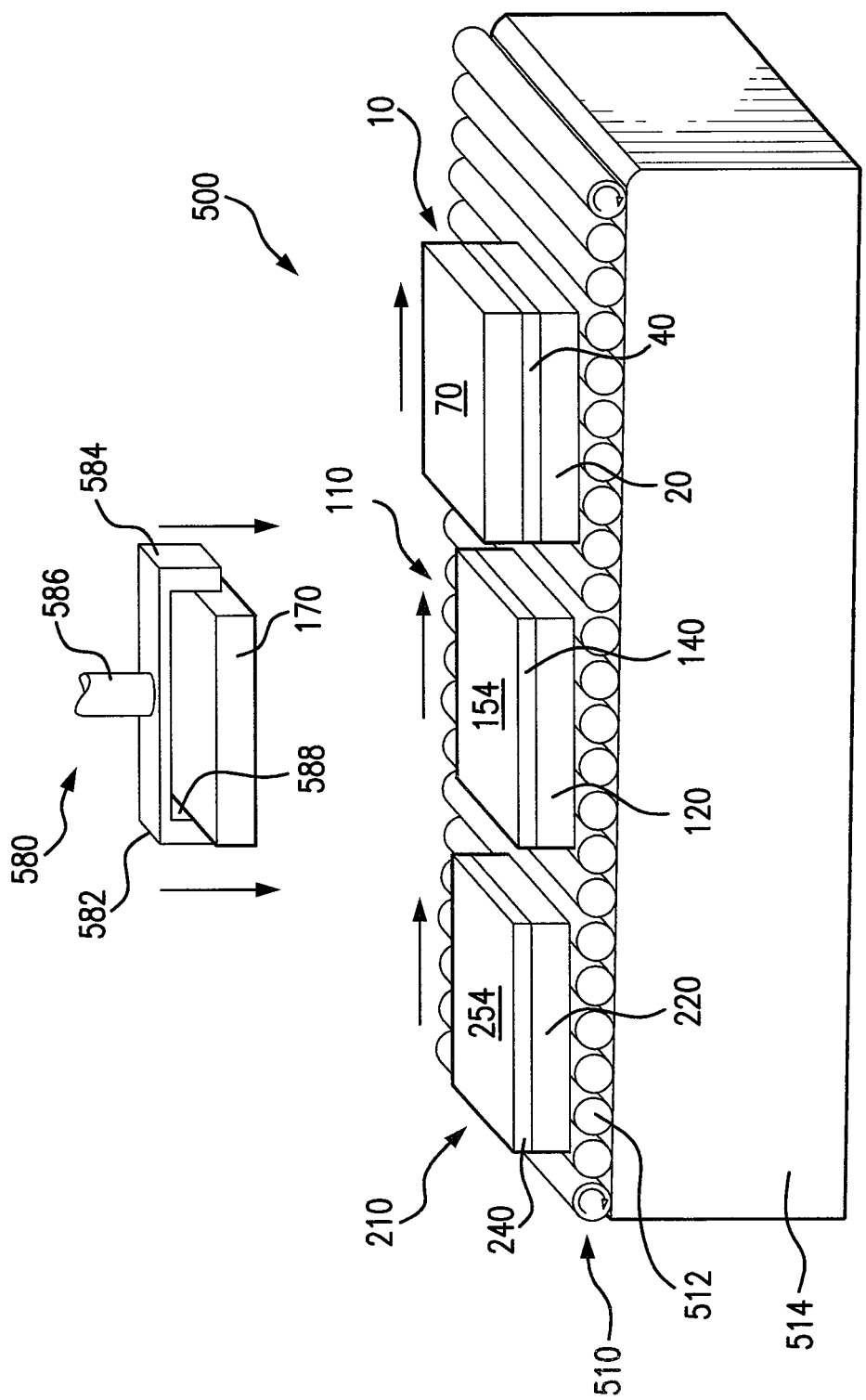
FIG. 9 is a perspective view of a third apparatus and depicts how an adhesive-backed flooring panel can be manufactured according to the present invention and shows an alternative application of an underlayer onto the double-sided adhesive sheet that has already been applied to the flooring panel body.

FIG. 9 is a perspective view of a third apparatus 500 that depicts how an adhesive-backed flooring panel 10, 110, or 210 can be manufactured according to the present invention and shows an alternative application of an underlayer 170 onto the double-sided adhesive sheet that has already been applied to second flooring panel body 120. Third apparatus 500 can be a continuation of first apparatus 300 or can be a standalone unit. Third apparatus 500 can include a third conveyor 510, a plurality of third conveyor rollers 512, and a third conveyor housing 514, similar or identical to conveyor 310 and its components. Third apparatus 500 can include a delivery subsystem 580 for delivering second underlayer 170 to second flooring panel 110. Delivery subsystem 580 can include a clamp 582, a clamp housing 584, and a third shaft 586 for raising and lowering clamp 582. Clamp 582 can include a clamp receptacle 588 within clamp housing 584 configured to grip underlayer 170. Any suitable gripping can be employed, for example, suction through a vacuum subsystem, or a friction fit. Release of underlayer 170 from clamp 582 can be achieved, for example, by shutting off a vacuum source, by the tack of the adhesive of double-sided adhesive sheet 140, by an adjustable/actuated mechanism of clamp 582, or by a combination thereof. Once underlayers have been added, the flooring panels can be sent through first apparatus 300 again to add a second double-sided adhesive sheet to the bottom of the underlayer, for example, the second double-sided adhesive sheet can include a cover layer if no further layers are to be added before packaging. Third apparatus 500, as well as a method of using the apparatus, are aspects of the present invention.

Figure 10:
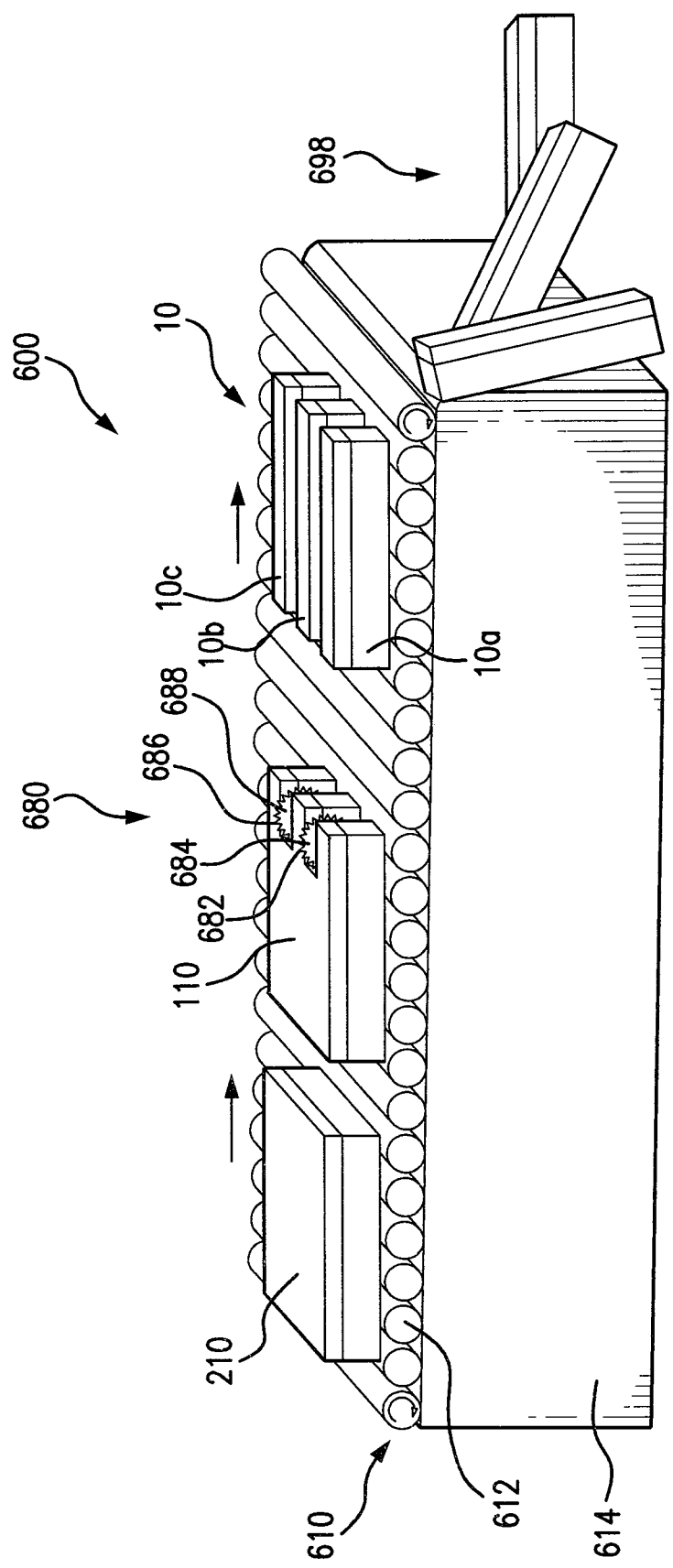
FIG. 10 is a perspective view of a fourth apparatus and depicts how an adhesive-backed flooring panel can be divided into a plurality of adhesive-backed flooring planks according to the present invention.

FIG. 10 is a perspective view of a fourth apparatus 600 that depicts how an adhesive-backed flooring panel 110 can be divided into a plurality of adhesive-backed flooring planks 698 according to the present invention. Fourth apparatus 600 can be a standalone unit or a continuation of first apparatus 300, second apparatus 400, and/or third apparatus 500. Fourth apparatus 600 can include a fourth conveyor 610, a plurality of fourth conveyor rollers 612, and a fourth conveyor housing 614, similar or identical to conveyor 310 and its components. Fourth conveyor 610 can further include a third cutting subsystem 680 that can include a first cutter 682 having a first blade 684 and a second cutter 686 having a second blade 688. Although third cutting subsystem 680 is depicted having two cutters, it can have any suitable number of cutters, for example, depending on the number of planks desired and the desired widths of the planks. Alternatively or additionally, cutters can be mounted from above fourth conveyor 610. FIG. 10 shows a snapshot in which third cutting subsystem has already cut adhesive-backed flooring panel 10 into first, second, and third adhesive backed flooring panels 10a, 10b, and 10c, and is in the process of cutting second adhesive-backed flooring panel 110. Fourth apparatus 600, as well as a method of using the apparatus, are aspects of the present invention.

The adhesive-backed flooring panels and planks of the present invention can be used in any suitable flooring system. Accordingly, a flooring system is provided that can include a plurality of adhesive-backed flooring panels of the present invention adhered to a substrate. At least two panels of the plurality can be positioned adjacent to one another in a common plane. A slight or pronounced gap can be provided between adjacent panels to allow for decorative grouting, another type of flooring panel, or the like, to be placed between the adjacent panels. Alternatively, the adjacent panels can contact each other along portions of their respective perimeter edges in a gap-free juxtaposition. A sufficient number of panels can be used to cover a desired floor space. The substrate can be a subfloor or an intervening layer such as an underlayer, radiant heating system, floating floor layer, or the like. The panels that make up the flooring system can be identical or differ in any property, for example, size, shape, or composition. A flooring system can be made up of panels that form an overall coherent and/or decorative appearance based on the design of the top surface of the flooring panel bodies. Alternatively, panels having distinct types of top surface designs, for example, simulated wood grain and carpet, respectively, can be used to form distinct design regions of the flooring space. If the type of substrate (for example, concrete, wood, plastic polymer, brick, stone, or the like) varies across the floor space, panels differing in their second adhesive layer composition can be employed to match regions of differing substrate composition. For example, the tackiness of the second adhesive layer can be increased for flooring panels to be installed over regions of the substrate that are expected to resist adherence. Panels having a second adhesive layer with greater solvent resistance can be used in areas of the floor space that are susceptible to flooding. The type of underlayer can also be varied across the floor space.

Figure 5:
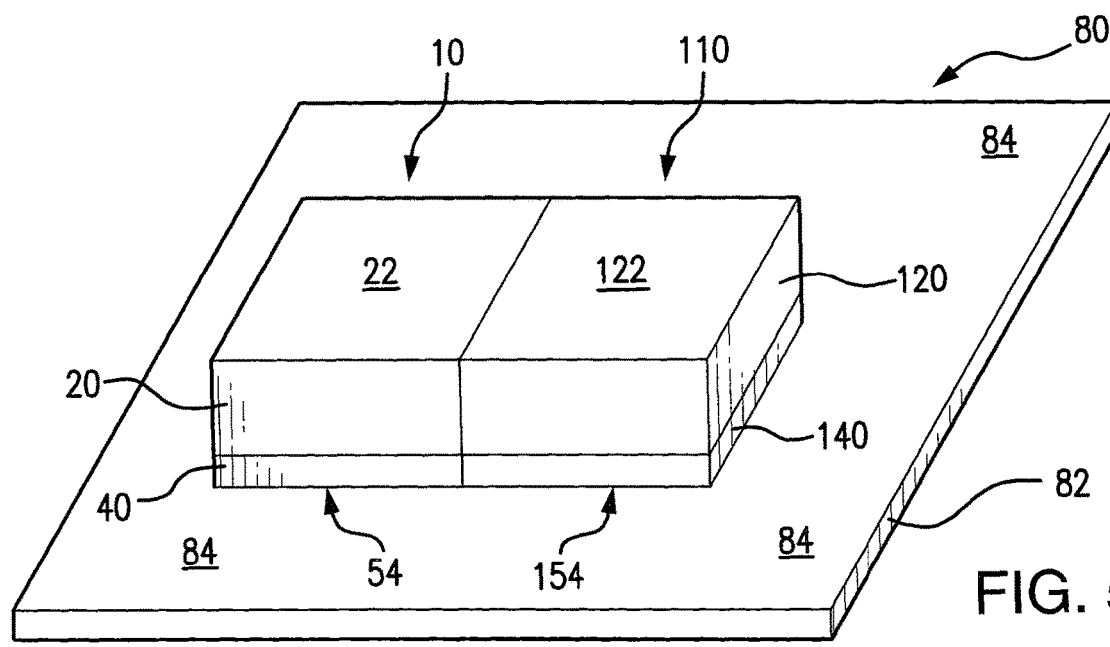
FIG. 5 is a flooring system of the present invention including two adhesive-backed flooring panels adhered to a substrate.

FIG. 5 is a flooring system 80 of the present invention including two adhesive-backed flooring panels 10, 110 adhered to a substrate 82. Adhesive-backed flooring panels 10, 110 are shown installed adjacent to one another on substrate 82. Second adhesive-backed flooring panel 110 is similar or identical to adhesive-backed flooring panel 10 including analogous flooring panel body 120 and double-sided adhesive sheet 140. Respective outer surfaces 54, 154 of double-sided adhesive sheets 40, 140 are adhered to a surface 84 of substrate 82. Respective top surfaces 22, 122 are visible. Although only two adhesive-backed flooring panels are shown in FIG. 5, any number of flooring panels of any shape and/or type can form part of flooring system 80.

Figure 12:
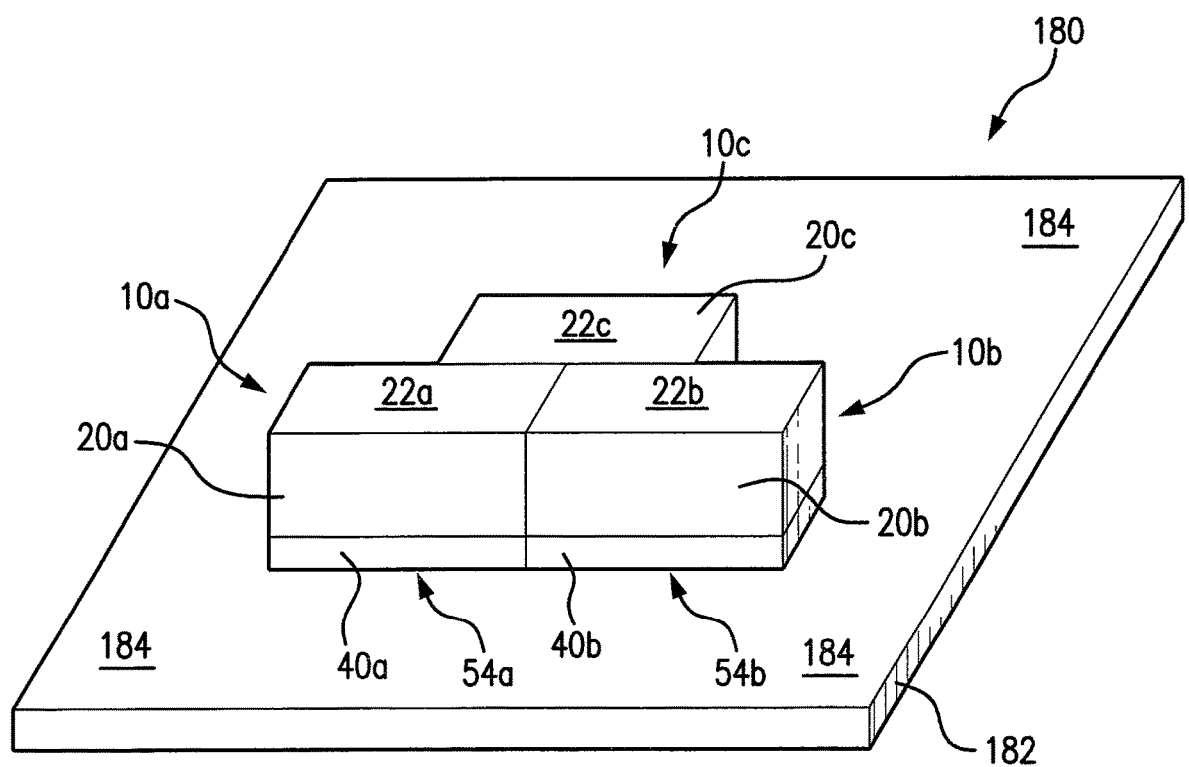
FIG. 12 is another flooring system of the present invention including three adhesive-backed flooring planks adhered to a second substrate.

FIG. 12 is another flooring system 180 of the present invention including three adhesive-backed flooring planks 10a, 10b, and 10c adhered to a second substrate 182 analogous to flooring system 80 shown in FIG. 5. Adhesive-backed flooring planks 10a, 10b, and 10c are shown installed adjacent to one another on substrate 182. Second adhesive-backed flooring plank 10b is similar or identical to adhesive-backed flooring plank 10a including analogous flooring plank body 20b and double-sided adhesive sheet portion 40b. Third adhesive-backed flooring plank 10c is analogous to first and second adhesive-backed flooring planks 10a and 10b including a flooring plank body 20c. Top surfaces 22a, 22b, and 22c are visible. Respective outer surfaces 54a, 54b of double-sided adhesive sheet portions 40a, 40b are adhered to a surface 184 of substrate 182. Although only three adhesive-backed flooring planks are shown in FIG. 12, any number, shape, and/or type of flooring planks can form part of flooring system 180. A plurality of adhesive-backed flooring planks can be packaged in a manner analogous to the plurality of adhesive-backed flooring panels (98) shown in FIG. 6 depicting packaged flooring system 90.

A packaged flooring system is also provided according to the present invention. The packaged flooring system can include a package containing a plurality of the adhesive-backed flooring panels of the present invention. The panels can include a removable cover sheet to prevent the panels from adhering to each other in the package. The plurality of panels can be stacked on top of one another and parallel to one another, for example, such that the top surface of one panel is adjacent and parallel to the cover sheet of the next panel. Any number or combination of types of flooring panels can be packaged together to enable the installation of a flooring system of the present invention. Any suitable package can be used, for example, a cardboard box, a crate, a shrink-wrap, a strap, a net, a palate, an envelope, any combination thereof, or the like.

Figure 6:
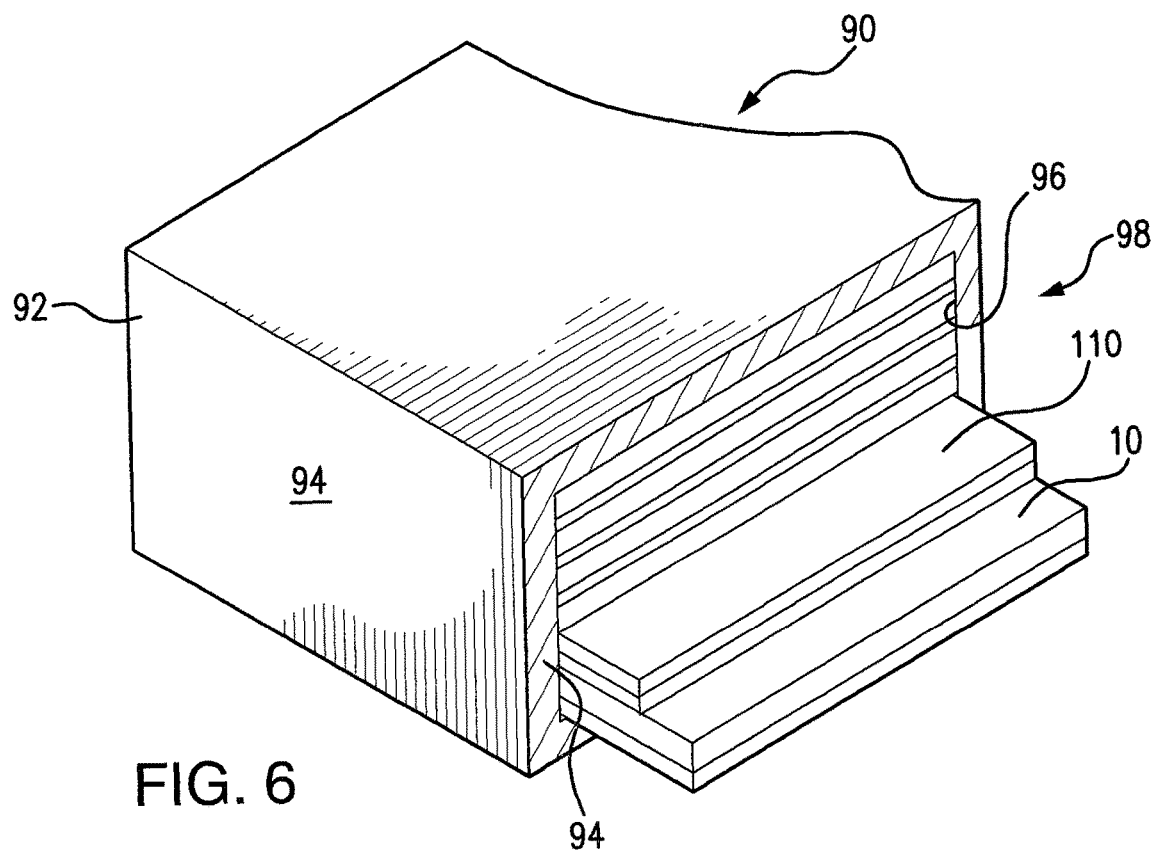
FIG. 6 is a packaged flooring system of the present invention including a package containing a plurality of adhesive-backed flooring panels.

FIG. 6 is a packaged flooring system 90 of the present invention including a package 92 containing a plurality 98 of adhesive-backed flooring panels. Package 92 can include a package housing 94 and a package interior 96 containing plurality 98 of adhesive-backed panels. Adhesive-backed flooring panels 10, 110 are depicted as two panels of plurality 98 and are partially pulled out from package interior 96. Each panel can include a cover sheet to help prevent the panels from sticking to each other while packaged. Plurality 98 can include any number, shape, and/or type of flooring panels. Packaged flooring system 90 can be used to form a flooring system such as flooring system 80 shown in FIG. 5.

Any suitable method of installation can be used to install the adhesive-backed flooring panels and planks. Accordingly, a method of installing a flooring system of the present invention is also provided. The method can include installing one or more adhesive-backed flooring panels of the present invention on a substrate, for example, directly on a subfloor or on an underlayer on a subfloor. The method can include providing a plurality of adhesive-backed flooring panels each having a peel-away cover sheet. The peel-away cover sheet can be removed from a first adhesive-backed flooring panel of the plurality. The first adhesive-backed flooring panel can then be adhered to the substrate. A second peel-away cover sheet can then be removed from a second adhesive-backed flooring panel of the plurality. The second adhesive-backed flooring panel can then be adhered to the substrate adjacent to the first adhesive-backed flooring panel. This process can be repeated until a floor space or a desired portion thereof is covered with the double-sided adhesive-backed flooring panels. The method can optionally use adhesive in addition to that provided by the double-sided adhesive sheet. The method can be performed to achieve any particular embodiment of the flooring system described herein or that is otherwise apparent from the present teachings.

The flooring panel body can have any suitable material composition and/or physical design. For example, the flooring panel body can be resilient flooring, such as vinyl flooring or a luxury vinyl tile (LVT) flooring. The flooring panel body can a luxury vinyl tile (LVT). The flooring panel body can be wood, wood composite, ceramic, stone, concrete, metal, fiberglass, plastic, carpeting, rubber, elastomer-based, recycled flooring or parts thereof, or any combination thereof. The composition of the flooring panel body can be uniform or non-uniform. The top surface of the flooring panel body can comprise a decorative design that can optionally be embossed.

The flooring panel body can include, for example, one or more base layers containing a homogenous blend of polymer material and filler. The polymer can be, for example, a thermoplastic polymer, a thermoset polymer, or blends of polymers. The filler can be, for example, a particulate material that is dispersible in the polymeric material. The filler can be, for example, an inorganic filler, an organic filler, cellulosic material, plant or tree material, or any combination of fillers. The polymeric material can form, for example, a continuous phase into which the filler is dispersed as a discrete phase. In another example, the composite sheet can include a laminate structure of diverse material layers including one or more base layers containing a homogenous blend of polymer material and filler. Two, three, or more base layers can be used that are the same as or different from one another with respect to composition and/or physical properties. The flooring panel body can include, for example, a luxury vinyl tile (LVT) material, a vinyl composition tile (VCT) material, or a rubber material. Other resilient polymer-containing composite sheet materials can be used. The LVT material or other flooring panels can further include a top layer, which can include at least a printed design and wear layer(s), arranged on top of the base layer or layers. The VCT material can optionally have inlaid surface chips, but typically no wear layer or printed design is overlying the VCT material. The printed design can be present as a separate design layer, can be part of a wear layer or other layer, or can be printed on a layer, such as on a base layer or other layer. The VCT material, LVT material, or rubber material can further include a carpet surface layer to provide a carpet tile or plank. When a carpet surface layer is present, a design layer or surface or a printed design or print layer or print surface, or a wear layer can be omitted. The carpet layer can be located on one or more base layers with or without other layers as mentioned herein.

For purposes herein, a luxury vinyl tile (LVT) refers to a resilient tile floor covering including polymeric material and a minor amount (<50 wt %) of inorganic filler (based on the total wt % of the LVT). The LVT material can meet the requirements of ASTM F 1700, Class III (Printed Film Vinyl Tile). The LVT material can have a print design or film applied over one or more base layers or other intermediate layers with one or more clear (e.g., vinyl) wear layers on top of the print film. The base layer(s) of LVT can include polymeric material (or "binder"), fillers, and pigments compounded with suitable lubricants and processing aids. In LVT, the polymeric material can be present in an amount of at least 34 wt % polymeric material (or "binder") containing, for example, one or more thermoplastic polymers, such as polymers of vinyl chloride, copolymers of vinyl chloride, or both, and other modifying resins, and can include plasticizers. Further, the polymers and copolymers of vinyl chloride can include at least 60 wt % of the polymer material, and copolymers of vinyl chloride can include at least 85 wt % vinyl chloride. In various options, the LVT material can be configured to be non-grouted or grouted. The LVT material optionally can include a groove for receiving grout at the upper surface above where the profiled edges are mated. The grout can be polymeric (e.g., thermoplastic, silicone, acrylic), cement, cement-like, mortar, mortar-like, or can include other materials that can be used to fill in a void or grout line.

For purposes herein, a vinyl composition tile (VCT) material refers to a resilient tile floor covering material that can include polymeric binder material and inorganic filler in a predominant amount (≥50 wt %) based on the total weight of the VCT. The VCT material can include polymeric material (or "binder"), fillers, and pigments. The polymeric material can be one or more thermoplastic polymers, such as polymers of vinyl chloride, copolymers of vinyl chloride, or both, compounded with suitable plasticizers and stabilizers. The VCT material can meet requirements of ASTM F 1066. As indicated, the vinyl composition tile material can optionally have an inlaid construction at its upper surface, which does not change the overall thickness of the sheet product. The inlaid process can use, for example, solid colored vinyl chips that are laid on top of a VCT carrier sheet and then bonded together with heat and pressure, as used in a conventional manner for inlaid processes. In various options, the VCT material can be configured to be non-grouted or grouted. The VCT material optionally can include a groove for receiving grout at the upper surface above where the profiled edges are mated.

In various options, one or more, or all, of the base layers of the flooring panel body of the present invention can include one or more rubber or elastomer materials and at least one filler material. The rubber or elastomer can be present in the same amounts as those given for the thermoplastic polymer material, such as PVC, described herein. The rubber or elastomer can be the primary component (by weight) in one or more, or all, base layers. The rubber or elastomer can be a substitute for the thermoplastic or PVC ingredient that can be used in the base layer(s). The rubber or elastomer component can be considered a polymer for purposes of the present invention. Rubber-based base layer(s) of the flooring body panel can contain rubber (elastomer), fillers, and optionally pigment. The rubber can be, for example, a vulcanizable rubber, a reaction system elastomer, a thermoplastic elastomer, or other elastomers. Some filler, such as carbon black or others, also can function like a pigment to impart color to the base layer(s). The amount of filler in the rubber-based base layer(s) is not categorically limited, and can range, for example, from about 0.1 wt % to about 99 wt %, or from about 1 wt % to about 90 wt %, or from about 5 wt % to about 80 wt %, or from about 10 wt % to about 75 wt %, or from about 20 wt % to about 50 wt %, or can include other amounts, based on the total weight of the rubber-based layer(s).

The flooring panel body can have a laminate structure, for example, which combines a carpet layer as a surface layer and a substrate including the VCT, LVT, or rubber materials, or similar materials, to which the carpeting is attached. The carpeting can be permanently or removeably attached to the flooring panel body. The flooring panel body can include a carpet layer which can be any backed or non-backed carpet material, including conventional carpeting, which can be attached (e.g., adhesively, mechanically, and so forth) to a major surface of the substrate. The flooring panel body can have a substrate formed of one or more of the base layers of VCT, LVT, or rubber material(s) to which is adhesively bonded or thermally bonded (e.g., heated press laminated) a carpet layer (e.g., a cut pile, a loop pile, a cut and loop pile, a (print) tufted pile, and so forth).

The flooring panel of the present invention can be used essentially in any room in a house or work environment, including the kitchen, bathroom, living room, dining room, recreation room, garage, and outside living spaces, such as a porch, deck, and the like. The flooring panel of the present invention can be used in an inside or outside environment, especially because the surface coverings of the present invention are water resistant and do not swell when wet. In fact, the thickness swell of the flooring panel of the present invention can be negligible (e.g., zero or zero to less than 0.01 mm or 0.0001 mm to less than 0.001 mm) when tested at LF 3.2 of NALFA LF 01-2003. The flooring panel body can be water resistant. The resulting flooring panel can be used indoors or outdoors. Further, the flooring panels can be resistant to various chemicals and detergents and, therefore, can even be used in industrial, recreational, or garage environments. For example, the flooring panels can be water resistant such that they will not swell by immersing the material in water for about 24 hours or longer.

Although not rollable, the flooring panels are resilient and are not required to be rigid. The flooring panel can bend or bow significantly if the flooring panel body is held at one edge without rolling. This optional flexibility is quite advantageous when installing the flooring panels, because they will conform to any imperfections in the sub-floor or floor that they are being installed upon. The flooring panel can have one or more of the following mechanical properties:

1. Flexural Force @ 0.3" (pli)—Modified ASTM D790: 1+/−0.35;
2. Pull Strength—modified ISO 24334: at least 2 pli per overall thickness (mm) ratio;
3. Tensile strength (psi)—ASTM D638: 750 psi+/−55 psi;
4. Elongation (%)—ASTM D638: 34+/−9;
5. Break Load (pli)—ASTM D638: 31+/−1.5;
6. Pneumatic Indentation at 3000 psi (inch)—<0.005; and/or
7. Residual Indentation at 750 psi (inch)—ASTM F-970: <0.002.

The flooring panel can have, for example, one, two or more, three or more, four or more, five or more, six or more, or all seven of these properties, in any combination.

If the flooring panel body has a laminate construction, the flooring panel body can have one or more of the following de-lamination properties: a de-lamination force between layer and layer based on modified ASTM D3164; or a de-lamination value of 10 (pli)+/−2.5. Preferably, the flooring panel body has both of these de-lamination properties.

The flooring panel can have one or more of the following surface properties:

a. Taber Abrasion—NAFLA 33.13 LF01-2003-Wear 3.7: >350 cycles;
b. Scratch resistance by fine steel wool—not visible;
c. Scuff by sneaker sole—no scuff mark;
d. Stain property—Modified ASTM 925: 0—3 (no stain—strong stain):
 i. Food stainants: 0
 ii. Asphalt sealer: 0
 iii. Oil dye: 1
 iv. Shoe Polish: 1
 v. Blue Sharpie Marker: 1
 vi. Fertilizer: 0
 vii. Iodine: 3;
e. Heat & light stability—ASTM 1514 & 1515: Delta E<3; and/or
f. C.O.F (dry neolite sole)—ASTM C1028: >0.5.

The flooring panel can have at least one of these properties, or at least two of these properties, or at least three of these properties, or at least four of these properties, or at least five of these properties, or all six of these properties, in any combination. The flooring panel can have any combination of the properties, as well as other properties. The flooring panel can have each of the mechanical properties, de-lamination properties, joint strength properties, surface properties, or one, two, or three of these properties in any combination. Thus, the flooring panel can selectively have various properties. As indicated, references herein to a flooring panel, including mechanical and surface properties thereof, can also be applied to the flooring panel body, and vice versa.

The flooring panel body can be formed as a resilient composite sheet, or can be made to include a substrate containing a resilient composite sheet (e.g., a carpet tile). The composite sheet can be a base layer portion containing a homogenous layer(ing) of polymer and filler, a laminate including such a base layer portion, or other variations thereon. The base layer portion of the composite sheet can include a polymeric binder and filler that provide a resilient material. As indicated, LVT-, VCT-, and rubber-based plank constructions are illustrative, and other resilient composite sheet constructions can be used in the flooring panel body.

The polymer (polymeric binder) can be any one or more polymers. For example, the polymer can be a thermoplastic or thermoset polymer. The polymer can be any polymer, including natural products and synthetic products. Generally, any polymeric material, combination thereof, alloys thereof, or mixtures of two or more polymers can be used to form the base layer portion. The polymeric material can be, for example, a thermoplastic polymer, a thermosetting polymer, a rubber (elastomer), or any combination thereof. Further, the polymer can be, for example, any type of polymer, such as a homopolymer, random polymer, alternating polymer, graft polymer, block polymer, star-like polymer, comb-like polymer, crosslinked polymer, and/or vulcanized polymer. The polymer can be one or more polyblends. The polymer can be, for example, a thermoplastic elastomer (TPE), an interpenetrating polymer network (IPN); a simultaneous interpenetrating polymer network (SIN); or an interpenetrating elastomeric network (IEN).

The polymer can be, for example, a silicone-containing polymer, for instance, polydimethyl siloxane, fluorosilicones, silicone-organic polymers, or silicone-organic hybrid polymers. Other examples of polymers include, but are not limited to, olefin-containing, diene-containing, and butene-containing polymers and copolymers. Particular examples include elastomers such as solution styrene-butadiene rubber (SBR), natural rubber, emulsion SBR, polybutadiene, polyisobutadiene, polyisoprene, polychloroprene, NBR, EPDM, EPM, isobutene elastomers, and their functionalized or modified derivatives or blends thereof. Other examples of polymers include, but are not limited to, linear and non-linear polymers such as polyethylene, poly(vinylchloride), polyisobutylene, polystyrene(s), polycaprolactam (nylon), polyisoprene, and the like. Other general classes of polymers include polyamides, polycarbonates, polyelectrolytes, polyesters, polyethers, (polyhydroxy)benzenes, polyimides, polymers containing sulfur (such as polysulfides, (polyphenylene) sulfide, and polysulfones), polyolefins, polymethylbenzenes, polystyrene and styrene copolymers (ABS included), acetal polymers, acrylic polymers, acrylonitrile polymers and copolymers, polyolefins containing halogen (such as polyvinyl chloride and polyvinylidene chloride), cellulose acetate, ethylene-vinyl acetate, polyacrylonitrile, fluoropolymers and fluoroplastics, ionomeric polymers, polymers containing ketone group(s), polyketone, liquid crystal polymers, polyamide-imides, polyaryletherketone, polymers containing olefinic double bond(s) (such as polybutadiene, polydicyclopentadiene), polyphenylene oxides, polyurethanes, thermoplastic elastomers, polyolefins (such as polyethylene, 1-butene, polypropylene, 1-hexene, 1-octene, 4-methyl-1-pentene, substituted alpha-olefins, and the like), polyolefin copolymers (such as copolymers of: ethylene, 1-butene, propylene, 1-hexene, 1-octene, 4-methyl-1-pentene and substituted alpha-olefins and the like), polyolefin terpolymers, polycarbonates, silicone polymers, alkyd, epoxy, unsaturated polyester, vinyl ester, urea-, melamine-, or phenol-formaldehyde resins, and the like. Other examples of the polymer can be an acrylic polymer, a methacrylic polymer, a styrenic polymer, or a silicone polymer. The polymer present in the polymeric product of the present invention can be a polyolefin. The molecular weight of the polymer can be, for example, from 10,000 to 1,000,000, or from 50,000 to 500,000, or from 100,000 to 200,000, or other values, based on weight average molecular weight.

The polymeric material can be a thermoplastic polymer that includes, but is not limited to, vinyl containing thermoplastics such as polyvinyl chloride, polyvinyl acetate, polyvinyl alcohol, and other vinyl and vinylidene resins and copolymers thereof; polyethylenes such as low density polyethylenes and high density polyethylenes and copolymers thereof; styrenes such as ABS, SAN, and polystyrenes and copolymers thereof, polypropylene and copolymers thereof; saturated and unsaturated polyesters; acrylics; polyamides such as nylon containing types; engineering plastics such as acetyl, polycarbonate, polyimide, polysulfone, and polyphenylene oxide and sulfide resins and the like. One or more conductive polymers can be used to form the flooring panel body, which has applications in conductive flooring and the like. The thermoplastic polymers set forth in Kirk Othmer (3rd Edition, 1981) at pp. 328 to 848 of Vol. 18 and pp. 385-498 of Vol. 16, (incorporated in its entirety by reference herein) can also be used as long as the resulting flooring panel body has sufficient strength for its intended purpose.

The thermoplastic material can be, for example, a rigid polyvinyl chloride and/or semi-rigid or flexible polyvinyl chloride. In general, for the present invention, the flexibility of the thermoplastic material and/or any polymer used herein for any flooring panel body can be imparted by using at least one liquid or solid plasticizer which is preferably present in an amount of from about 1% to 30% by weight of the layer, such as less than 25% by weight (e.g., from 1% to 10% by weight or from 4 wt % to 15 wt %, or from 5 wt % to 25 wt %). A typical compound used in the flooring panel body to form the base layer portion can include, but is not limited to, polymer(s), plasticizer(s), pigments, impact modifiers, stabilizers, processing aids, lubricants, fillers, wood flours, and/or other conventional additives, and the like.

The thermoplastic polymer compound to be processed can be in powder, liquid, cubed, or pelletized form and/or in any other extrudable form. Also, the thermoplastic polymer can be virgin, recycled, or a mixture of both. Furthermore, the thermoplastic material can be incorporated with a blowing agent(s) or a mechanically injected gas during the extrusion process to make a cellular foam structure core.

The thermoplastic material used to form the base layer portion, which can be polyvinyl chloride, can be a suspension grade or mass polymerization grade homopolymer resin having a preferred molecular weight as reflected by an inherent viscosity of from about 0.88 to about 1.0. In general, a higher molecular weight polymer is preferred from the standpoint of processing stability and preferably the molecular weight distribution and particle size distribution are narrow in order to provide a good balance between processability and properties. Also, high porosity and uniform porosity of the resin particles are preferred to optimize compounding and processing aspects, including the fast and uniform absorption of any stabilizer that is present as well as other ingredients during compounding. A thermoplastic material used to form the base layer portion can be a PVC powder compound that has good impact strength, ease of processing, high extrusion rate, good surface properties, excellent dimensional stability, and indentation resistance.

The polymer can include a vinyl chloride homopolymer and a vinyl copolymer, such as a vinyl chloride-vinyl acetate copolymer, wherein the vinyl chloride homopolymer can be present in the composition in an amount from about 1 wt % to greater than 50% by weight of the combined amount of vinyl chloride homopolymer and a vinyl copolymer, such as vinyl chloride-vinyl acetate copolymer (e.g., from about 1 wt % to about 20 wt %, from about 20 wt % to about 40 wt %, from about 40 wt % to about 60 wt %, about 60 wt % or greater, about 65 wt % or greater, about 70 wt % or greater; or from about 75 wt % to about 99 wt %). As a non-limiting example, the amount of vinyl chloride homopolymer in the virgin polymer can be from about 80 wt % to about 99 wt % based on the weight of the combined amount of vinyl chloride homopolymer and vinyl chloride-vinyl acetate copolymer, or can be from about 70%-99% (or more) by weight of the combined amount of vinyl chloride homopolymer and vinyl chloride-vinyl acetate copolymer, or can be from about 80% to 90% by weight of the combined amount of vinyl chloride homopolymer and vinyl chloride-vinyl acetate copolymer. The vinyl chloride copolymer and homopolymer can have any K-value or molecular weight. Additional properties of the vinyl chloride homopolymer and a vinyl copolymer are described, for example, in U.S. Patent Application Publication No. 2009/0226662, which is incorporated in its entirety by reference herein.

The base layer portion can include at least one polymer, such as a polyvinyl chloride, and also at least one plasticizer, at least one filler or filler source such as postindustrial recycled or post-consumer recycled materials such as gypsum, glass, energy by-products, wood, plastic, carpet or parts thereof, PVC, VCT recycled, and the like, or all of these. The base layer portion also can include at least one heat stabilizer. Other ingredients (for instance, in conventional amounts used in LVT or VCT tile formulations) can be present in the base layer or other layers of the composite sheet, such as flame retardants, UV stabilizers, antistatic agents, wear resistant particles, antimicrobial additives, pigments, processing aids, dispersion additives, lubricants, colorants, modifying resins, cross-linking agents, antioxidants, foaming agents, tackifiers, and/or other conventional organic or inorganic additives commonly used in polymers (e.g., vinyl) used in tile or sheet surface coverings.

The filler can be any filler, including any conventional filler, which can be used in solid vinyl or vinyl composition tiles, and/or in rubber compositions. The filler can be a natural filler or a synthetic filler. The filler can be in the form of particles, short fibers, flakes, and other discrete forms. In a flooring panel body having a base layer or base layers containing LVT material or VCT material, inorganic filler can be used. Examples of inorganic filler can include, but are not limited to, hydrated alumina, magnesium carbonate, calcium sulfate, silica, precipitated silica, fumed silica, fly ash, cement dust, glass, clay, talc, calcium carbonate, barium sulfate, silicates, aluminum trihydrate, talc, clay, kaolin, wollastonite, gypsum, solid or hollow glass microspheres, and the like. Inorganic fillers can be, for example, mineral fillers. The filler also can be a non-mineral or organic filler such as carbon black, wood flour, cellulose-derived materials, ground rice hulls, solid or hollow temperature resistant polymer microspheres or microbeads (e.g., phenolic microspheres), and the like. Carbon black, for example, can be used as filler in rubber-based base layers, or other types of base layers, of flooring panel tiles. The inorganic and organic fillers can be used in combinations in the base layers, or either type can include the sole type of filler used in the base layers.

An inorganic filler can be used in a base layer or base layers containing LVT material or VCT material. This inorganic filler can include, for example, any conventional filler that can be used in solid vinyl or vinyl composition tiles. The filler can be recycled from any source. An inorganic filler typically provides dimensional stability and reduced elasticity to a vinyl composition tile, and can provide properties of fire resistance. As a non-limiting example, limestone (e.g., calcium carbonate with magnesium carbonate) can be used as the filler. A specific non-limiting example is dolomitic limestone (which can be screened), such as supplied by Specialty Minerals, Inc. under the product code DF-5025 and having a top mesh size of about 50 and a percent passing a 200 mesh sieve of about 25 wt %. Other inorganic fillers that can be used include clay, talc, silicates, or aluminates. Freshly added or supplemental filler can be in any physical form that allows it to be mixed or blended with the other ingredients to form a vinyl composition tile formulation that can be processed into a vinyl composition tile. Typically, added filler is in the form of particles. As a non-limiting example, an inorganic filler can be used for the full amount of filler described for a base layer formulation herein (e.g., the LVT or VCT base layers), or other proportions (e.g., at least about 50 wt %, at least about 60 wt %, at least about 70 wt %, at least about 80 wt %, at least about 90 wt %, at least about 99 wt %, or up to 100 wt % of all filler). As another non-limiting example, a mineral filler, such as a particulate mineral filler, can be used for the full amount of inorganic filler described for a base layer formulation herein, or other proportions (e.g., at least about 50 wt %, at least about 60 wt %, at least about 70 wt %, at least about 80 wt %, at least about 90 wt %, at least about 99 wt %, or up to 100 wt % of all inorganic filler). In other examples, such as for some rubber-based base layers, an organic or non-mineral filler such as carbon black can be used for the full amount of filler described for a base layer formulation herein, or other proportions (e.g., at least about 50 wt %, at least about 60 wt %, at least about 70 wt %, at least about 80 wt %, at least about 90 wt %, at least about 99 wt %, or up to 100 wt % of all filler).

A stabilizer typically provides heat stability and/or UV light stability to a vinyl chloride polymer formulation. The stabilizer according to the present invention can be selected for effectiveness with the particular polymer used and can be a calcium-zinc stabilizer. A calcium-zinc stabilizer containing about 5.5 wt % or more zinc can be used, such as about 6.0 wt % to about 10.0 wt % zinc. Specific, non-limiting examples of zinc-calcium stabilizers are supplied by Chemson, Inc. under the product codes of PTP113 (5.8% zinc, 10.5% calcium by weight). Other examples of stabilizers include, but are not limited to, barium-cadmium stabilizers, barium-zinc stabilizers, organotin stabilizers, epoxidized soybean oils, and the like.

The plasticizer can be any plasticizer, including any conventional plasticizer that can be used in vinyl resins. Examples include, but are not limited to, processing oils, polyesters, polyethers, polyether esters, and/or mixtures thereof. The plasticizer can be in the form of an oily liquid that softens vinyl and adds flexibility to a composition containing a vinyl resin. For example, the plasticizer can be a phthalic diester or a mixture of phthalic diesters, such as a mixture of diisononyl phthalate (DINP), and butyl benzyl phthalate. A suitable plasticizer containing about 10 wt % diisononyl phthalate and about 90 wt % butyl benzyl phthalate, for example, is provided by Ferro Corp. designated with a product code of Santicizer-160 (S-160). Other examples of plasticizers include, but are not limited to, di(2-ethylhexyl) phthalate (DOP), diisooctyl phthalate (DIOP), ditridecyl phthalate (DTDP), dihexyl phthalate (DHP), diiosdectyl phthalate (DIDP), any combination thereof, and the like. The selection criteria of plasticizers can be to enhance flexibility, resiliency, and/or melt flow.

One or more coupling agents can optionally be present in a vinyl formulation, such as a maleic anhydride. The coupling agent(s) is especially preferred when 1% or less by weight of vinyl copolymer is present. Generally, the coupling agent can be present in an amount sufficient to permit sufficient coupling of the homopolymer and/or other components. Amounts can be, for instance, from about 5% by weight or less (e.g., from about 0.1 wt % to 4 wt %) based on the weight of a homopolymer and vinyl copolymer present. Other amounts can be used.

The base layer portion formulation can be in any physical form suitable for storage and/or for use to form a base layer. For example, all of the ingredients except the plasticizer are typically solid ingredients and are typically in powder or pellet form. Accordingly, these ingredients can be mixed in any order and by any method known in the art for combining powder, and the plasticizer, which is typically a liquid, can be blended into the resulting mixture. The base layer formulation can be premixed and stored for a period of time prior to use, or can be mixed just before, or even during, a process for manufacturing the base layer. The components, additional layers, and/or methods of U.S. Pat. Nos. 8,833, 028; 5,112,671; 4,614,680; 4,187,131; 4,172,169; 4,423, 178; 4,313,866; and 5,380,794 can be used in the present application and these patents are incorporated in their entireties by reference herein.

The flooring panel body can include, for example, at least one base layer containing polyvinyl chloride, at least one plasticizer, at least one inorganic filler, and at least one stabilizer. For VCT, the at least one base layer can include inorganic filler in a predominant amount. The amount of filler can be, for example, from about 50 wt % to about 98 wt %, from about 51 wt % to about 98 wt %, from about 55 wt % to about 95 wt %, from about 60 wt % to about 90 wt %, from about 65 wt % to about 85 wt %, from about 70 wt % to about 80 wt %, from about 75 wt % to about 80 wt %, or any amount within one of these ranges, based on the wt % of the overall composition. For example, the at least one base layer can include from about 15 wt % to about 30 wt % polyvinyl chloride, from about 4 wt % to about 10 wt % plasticizer, from about 50 wt % to about 80 wt % filler, and from about 1 wt % to about 5 wt % stabilizer. In one example, the at least one base layer, or multiple base layers, or all the base layers used in a flooring panel body, can include from about 22 wt % to about 30 wt % polyvinyl chloride, from about 24 wt % to about 29 wt % polyvinyl chloride, or from about 25 wt % to about 28 wt % polyvinyl chloride. The amount of plasticizer can be increased, such as proportionally, relative to an increased amount of polyvinyl chloride, and the amount of filler can be decreased, such as proportionally, relative to increased amounts of polyvinyl chloride and plasticizer. Other ingredients can be used, for example, in the above-indicated amounts. The increased amount of polyvinyl chloride, such as from about 22 wt % to about 30 wt % polyvinyl chloride, can impart, for example, greater flexibility in the flooring panel body made with the composition.

The at least one base layer can include a multiple base layer construction, such as including a first base layer containing polyvinyl chloride, plasticizer, inorganic filler, and stabilizer, and a second base layer attached to a lower surface of the first base layer, and so forth. These different base layers can have the same or different compositions. These different base layers can be co-extruded or extruded or molded separately prior to being consolidated together into a unitary base portion by lamination or adhesion, or by other methods.

At least first and second base layers can be included in the base layer portion where one base layer has a lower wt % polyvinyl chloride, plasticizer, and stabilizer, and a higher wt % inorganic filler, than another base layer. For example, one base layer can include, for example, from 15 wt % to 30 wt % polymer, such as polyvinyl chloride, from 4 wt % to 10 wt % plasticizer, from 50 wt % to 80 wt % filler, and from about 1 wt % to 5 wt % stabilizer, based on the weight of the base layer, and another base layer can include from 25 wt % to 40 wt % polymer, such as polyvinyl chloride, from 7 wt % to 15 wt % plasticizer, from 40 wt % to 60 wt % filler, and from 2 wt % to 10 wt % stabilizer, based on the weight of this base layer. A third base layer also can be included, or more, having a composition that is the same as or different from the other two base layers. These base layers can include other optional ingredients and can contain more than one component in each category, such as more than one polymer, more than one plasticizer, more than one filler, and/or more than one stabilizer. That is, the one base layer can be located adjoining and adhered to the other base layer. The multiple base layers can be bonded or otherwise adhered to each other through pressure and/or heat.

Flooring panels can have a laminate construction, such as an LVT laminate structure. In the laminate designs, the flooring panel body contains a base layer portion, which in this embodiment can be referenced as a laminate core, and this core has a top surface. Located or affixed on the top surface of the core is a print layer. The print layer has a top surface and a bottom surface. Affixed onto the top surface of the print layer is an overlay or wear layer having a top surface and a bottom surface. An underlay layer can optionally be located and affixed between the bottom surface of the print layer and the top surface of the core. The flooring panel body can optionally have a backing layer.

The print layer can be, for example, a PVC film or an aminoplast resin impregnated printed paper. The print layer can be, for example, a printed design, such as to simulate various wood grains. The printed design can be any design that is capable of being printed onto the print layer. The print layer is also known as a decor print layer. Generally, the print layer can be prepared by rotogravure printing techniques or other printing means such as digital printing. Once the paper has the design printed on it, the paper can then be impregnated with an aminoplast resin or mixtures thereof. The aminoplast resin can be, for example, a blend of a urea formaldehyde and a melamine formaldehyde.

A print paper, if used, also known as the décor paper, can have the ability to have liquids penetrate the paper. For example, a melamine liquid can penetrate in about 3 to 4 seconds and also maintain a wet strength and even fiber orientation to provide good reinforcement in all directions. The resin used for the impregnation can be, for example, a mixture of urea formaldehyde and melamine formaldehyde resins. Urea formaldehyde can contribute to the cloudiness of the film that is formed and thus is not preferred for dark colors. The melamine resin imparts transparency, high hardness, scratch resistance, chemical resistance, and good formation, but can have high shrinkage values. Combining urea resins with melamine resins in a mixture, or using a double impregnation technique (i.e., applying one resin after another, sequentially) provides a positive interaction in controlling shrinkage and reducing cloudiness. The type of paper used can be, for example, a 75 g/m$^2$ weight paper having a thickness of about 0.16 mm. The saturation of the coating can be, for example, about 64 g/m$^2$. For purposes of the present invention, the print layer can be a design printed directly onto a layer, such as directly on a base layer or other layer, using digital ink jet printing or other direct printing methods.

Located optionally on the top surface of the print layer is an overlay, which is also referred to as a wear layer. The wear layer can be made of any suitable material known in the art for producing such wear layers, such as a polymeric film or overlay paper. The wear layer can be, for example, a transparent poly(vinyl chloride) layer. The dry film thickness of this PVC wear layer is not critical and it is preferably from about 5 mils to about 50 mils, and more preferably from about 10 mils to about 20 mils. Other examples of this wear layer include, but are not limited to, acrylic polymers, polyolefins, and the like. The wear layer can be a plasticized or a rigid polyvinyl chloride composition, and/or can be or include other polymers, such as clear polymers. The wear layer topcoat can be a thermoset layer or a thermoplastic layer. Examples of such wear layers can be found, for example, in U.S. Pat. No. 4,333,987 to Kwart et al., U.S. Pat. No. 4,180,615 to Bettoli, U.S. Pat. No. 4,393,187 to Boba et al., and U.S. Pat. No. 4,507,188 to Chu. The wear layer top coat can include hard, thermoset, radiation-curable acrylate monomers and or oligomers having a glass transition temperature (Tg) of greater than 50° C. With respect to the overlay, the amount of aminoplast resin (or other resin(s)) can be from about 60 to about 140 g/m$^2$, such as from about 100 to about 120 g/m$^2$.

A top layer underlay can be located and affixed between the bottom surface of the print layer and the top surface of the base layer. The top layer underlay can be present and can be a paper impregnated with a resin(s), such as an aminoplast resin as described above. The top layer underlay can be Kraft paper impregnated with a resin(s) such as an aminoplast resin or a phenolic resin, like phenolic formaldehyde resin or melamine formaldehyde resin. The resin(s) can be present in an amount of from about 60 g/m$^2$ to about 145 g/m$^2$, such as from about 100 g/m$^2$ to about 120 g/m$^2$ paper. The type of paper used can be from about 100 to about 200 g/m$^2$, such as about 145 g/m$^2$ and can have a thickness of from about 0.1 to about 0.4 mm, such as about 0.25 mm. The top layer underlay can be used when extra impact strength resistance is required. The top layer underlay can be a film or sheet, such as a polymeric film or sheet using or containing one or more of the polymers mentioned above for the base layer, or can include other polymers, optionally with other additives, such as fillers, plasticizers, stabilisers, and the like.

The wear layer can include multiple layers, such as a wear layer and a wear layer top coat (or top coat layer). The wear layer top coat, (e.g. radiation curable acrylates) can have a glass transition temperature of greater than about 50° C., such as at least about 67° C. The thickness of the wear layer top coat, once cured, can be from about 0.1 mil to about 2.5 mil, such as from about 0.75 mil to about 1.1 mil.

To achieve excellent scuff, scratch, and abrasive wear resistance, the combined wear layer base coat plus wear layer top coat dry film thickness can be, for example, at least about 10 mil. The dry film thickness (DFT) is the thickness after curing. Additionally, to achieve excellent scuff, scratch and wear resistance, the wear layer top coat can have two layers of coating, and both layers can be thermoset. The bottom wear layer and the outermost wear layer top coat possessing thermoset characteristics can be formed by sufficient cross-linking within the bottom of the respective wear layer and the outermost wear layer top coat polymeric networks. The wear layer and/or wear layer top coat can each be cross-linked sufficiently to be insoluble in methyl ethyl ketone, isopropyl alcohol, and tetrahydrofuran.

The wear layer top coat can be, for example, a water-based, solvent-based, radiation-curable, non-radiation curable, UV-curable, or non-UV curable system. For example, the wear layer top coat can include acrylics, acrylates, urethanes, epoxies, other type vinyls, other type polymers, and blends thereof, as long as the composition, when cured, results in a resilient, thermoset coating with adequate cross-link density.

Optionally, one or more additional layers can be present, such as the layers described in U.S. Pat. No. 5,458,953, incorporated in its entirety by reference herein. Such additional layers include strengthening layers, additional foamable layers, and one or more wear layer base coat(s). The compositions of these layers are described in U.S. Pat. No. 5,458,953 and can be used in the surface covering of the present invention.

In the present invention, one or more layers can contain wear resistant particles, such as a wear layer and/or wear top coat layer (e.g., protective layer). One example is at least one layer containing aluminum oxide. The aluminum oxide used in the present invention is also known as alumina or $Al_2O_3$. The aluminum oxide can be fused or calcined. The refractive index can be from about 1.4 to about 1.7. A sufficient amount of the aluminum oxide and/or other wear resistant particles can be present in at least one layer of the surface covering to provide improved wear and/or stain resistance to a surface covering as compared with the layer having no aluminum oxide present. From about 2 $g/m^2$ to about 50 $g/m^2$, or from about 4 $g/m^2$ to about 20 $g/m^2$ of alumina, for example, can be present in at least one layer of the surface covering. Alternatively, from about 1% by weight to about 40% by weight of alumina can be present in at least one layer of the surface covering. Also, while any source of aluminum oxide can be used, the aluminum oxide can have the following characteristics: fused or calcined and having a hardness of from about 6 to about 9 on a Moh's scale, and most preferably about 9 on a Moh's scale. The particle size of the aluminum oxide can be, for example, from about 10 microns to about to about 70 microns, or from about 20 microns to about 50 microns. Sources of aluminum oxide are Washington Mills, N. Grafton, Mass.; ALCOA Industrial Chemicals, Bauxite, Ark.; Composition Materials, Fairfield, Conn.; Micro Abrasives, Westfield, Mass.; and Alu Chem, Inc., Birmingham, Ala. The aluminum oxide, which can be part of at least one layer of the surface covering, can be added in any manner known to those skilled in the art for adding particles to a layer. The aluminum oxide can be mixed into a wet coating or scattered on top of a wet coating. The aluminum oxide can be, for example, applied by a pellet dispenser, which applies or sprinkles aluminum oxide on top of a layer that is still "wet" or uncured. By the layer being "wet" or uncured, the aluminum oxide "sticks" or adheres to the "wet" layer and at least a portion of the aluminum oxide "sinks" into the layer and thus is not exposed to the environment. Instead of alumina, other metal oxides or ceramics can be used.

The mixing of alumina (and/or other hard particles) with a formulation that forms the wet coating generally involves constant mixing of the coating with alumina to preferably keep the alumina suspended in the coating. Surface treatments of the alumina and the use of other anti-settling agents help in minimizing the settling. Once the aluminum oxide is applied to the layer which is "wet" or uncured, the surface covering containing this layer is cured by means known to those skilled in the art, such as radiation curing, UV, electron beam, thermal, and/or moisture curing, and the like. The aluminum oxide can be present in the outermost layer of a surface covering which is the layer subjected to the environment including foot traffic and other objects coming in contact with the surface covering. Generally, this outermost layer is known as the top coat layer, wear layer top coat, or protective layer. This wear layer top coat can be a polymeric layer, such as a thermoset or thermoplastic, and can be made of urethane or acrylic, melamine, polyvinylchloride, a polyolefin, or the like.

Acrylics, alkyd resins, melamines, conventional clear coats, polyvinyl chloride, polycarbonates, Kevlar, epoxy coatings, polyester, polyester acrylates, vinyl-ether-functionalized urethane, epoxysiloxanes, epoxysilicones, multifunctional amine terminated acrylates, acrylate melamines, polyethylene and diene copolymers, and the like, can be used in place of the urethane based acrylates described herein. Generally, the wear resistance of any surface or coating can be improved by the incorporation of hard particles such as fused alumina. For example, the laminate forms of the present flooring panel bodies can be coated, for example, with from about 0.3 to about 2.5 mil of acrylated urethane-based UV-curable top coat or other top coat formulations. On the wet coat in a typical application, about 5-15 $g/m^2$ of fused alumina having an average particle size in the range of about 25-40 microns can be applied to this top coat by a modified Christy Machine or by a Schilling scattering machine and then the top coat can be cured by UV-light (or other radiation curable source) employing either a direct or differential cure mechanism. Depending on the product specification, the amount of alumina and the thickness of the coating can be varied. Also, for example, from about 15 to about 35 $g/m^2$ of alumina (in a layer) in the particle size range of about 50 to about 150 microns can be used in the production of non-slip coverings. Carborundum, quartz, silica (sand), glass, glass beads, glass spheres (hollow and/or filled), plastic grits, silicon carbide, diamond dust (glass), hard plastics, reinforced polymers and organics, and the like, can be substituted for all or part of the alumina. The techniques and formulations described in U.S. Pat. No. 6,291,078 can be used herein and this patent is incorporated herein in its entirety by reference.

The overlay or wear layer can also be an overlay paper. An overlay paper that can be used, includes, for example, an overlay paper, which upon being affixed onto the print layer, is clear in appearance. Types of overlay paper or other wear layers that can be used, include those as described in U.S. Patent Application Publications Nos.: 2006/0032175; 2007/0196624; and 2009/0031662, which are incorporated in their entireties herein by reference.

The flooring panel body can be formed using a variety of methods. For instance, the composite sheet of a flooring panel body can be formed by individually pre-forming the base layer or layers and/or any print layer that contains the print design. The wear layer can be present as an overlay wear layer or can be formed afterwards. The wear layer can include a protective layer, strengthening layer, and the like. Each of the base layers can be individually formed by calendar rolling, extrusion, or other techniques once the formulation for each of the base layers is prepared. Then, the layers that constitute the entire composite sheet or a part thereof can be placed on top of each other in a stack in their correct order and subjected to hot pressing using a hydraulic press to form a flooring panel body. For example, the composite sheet of the flooring panel body can be manufactured as multiple individual pressed sheets, which are consolidated into a unitary composite sheet forming the flooring panel body. Sheet layers including one or more base layers, a print layer, and optionally a wear layer, can be stacked in their correct order and subjected to hot pressing using a hydraulic press to form a laminated sheet. For instance, the temperature for pressing can range, for example, from about 125° C. to about 135° C. or other temperatures can be used above or below this range. The pressure can be, for example, from about 4 MPa to about 18 MPa, or other pressures above or below this range can be used. Generally, the time that the pressure can be applied, for example, is from about 30 seconds to about 2 minutes, such as about 1 minute or any time above or below. The consolidation to form the sheet can be a large sheet that can be punched or cut up into desired final dimensions of the flooring panel (or multiple flooring panels). For instance, during this hot pressing, the overall sheets can be about 1 meter×1 meter or larger or smaller. Once the hot pressing to form the consolidated sheet is achieved, the sheet can be then annealed to remove stress and achieve dimensional stability. The annealing can occur in an oven or other heating device. The annealing can occur at a temperature of from about 125° C. to about 135° C. This annealing can be done on a conveyor belt, through an infrared oven or a conventional air impinged oven, and the speed can be any suitable speed depending upon the length of the oven and the temperature setting. For instance, the speed of the conveyor belt can be about 3 meters per minute to about 10 meters per minute, such as about 3.5 meters per minute to about 8 meters per minute. Afterwards, the sheet can be aged at ambient conditions, such as about 25° C., for various hours, for example, for about 1 day (about 24 hrs.), for about 2 days (about 48 hrs.), for about 3 days (about 72 hrs.), or more. Afterwards, the sheet can be cut or punched out to flooring panel sizes. A top coat layer or protective layer, like a UV protective layer, optionally containing wear resistant particles, such as aluminum oxide or other wear resistant particles, can be applied, such as by means of a spray coating operation, a roller coating operation, an air knife coater, a curtain coater, or the like. The cold pressing operation can use various pressures, such as from about 10 to about 100 kg per square inch, or more, and for a time, such as about 1 hour to about 3 days, such as about 24 hours.

A flooring panel can contain, in lieu of a top layer, a design printed directly on the top surface of the flooring panel body using any number of printing techniques such as gravure printing, transfer printing, digital printing, flexo printing, and the like. Or, a printed thermoplastic film (e.g., PVC), a wood veneer, or the like, can be laminated to a thermoplastic flooring panel body. A protective coating can then be placed on top of the printed design. Any type of protective coating or wear layer can be used, such as a polyurethane type coating with or without wear resistant particles in the coating. Thus, a flooring panel body would have a core, where the core has a top surface, a bottom surface, as well as opposing sides, a printed design directly on the top surface of the flooring panel body, and optionally at least one protective coating on top of the printed design. The top surface of the flooring panel body can have a textured surface. This type of flooring panel body can be made by extruding a material containing at least one polymeric material into the shape of the core and then printing a design directly on the top surface of the flooring panel body and then, optionally, applying at least one protective coating on top of the printed design and curing the protective coating. The protective coating can be applied by conventional techniques, such as with a curtain coater, direct roll coater, vacuum coater, differential roll coater, air knife coater, or spray apparatus.

The flooring panel body can have a core and an extruded layer on the top surface of the core, wherein the extruded layer includes at least one thermoplastic material with one or more pigmented compounds. The extruded layer on top of the extruded core can simulate various designs such as wood grain and the like.

If a carpet layer is provided as part of the flooring panel body, it generally includes a textile substrate. Examples of textile substrates include, for example, hard backed or cushion backed textile substrates. The textile substrate can include, for example, textile fibers defiling a fibrous face, a primary backing to which the textile fibers are secured, and a secondary backing secured to the primary backing. The term "textile substrate" can relate to, for example, a woven fabric, a knitted fabric, a nonwoven fabric, an upholstery fabric, a tufted carpet, a piled carpet (e.g., cut piled), a pile and loop carpet, or any combination thereof, any of which can be formed from natural and/or synthetic fibers. In addition to a textile substrate, other carpet layers can optionally be included, such as a backing layer, a secondary backing layer, and any other polymer layer in a carpet structure (such as an intermediate layer, strengthening layer, polymer layer, and the like). Besides optional virgin thermoplastic material, other ingredients can be present along with optional recycled or reclaimed material, to form any carpet layer, such as one or more of a textile substrate, a backing layer, or an intermediate layer. These additional ingredients can include, for example, inorganic fillers, resins, plasticizers, stabilizers, foaming agents, and/or blowing agents, and the like. The use and amount of any one of these ingredients can be the same as conventionally used by those skilled in the art in forming such carpet layers. In some examples of manufacturing the flooring panel body, the substrate material (e.g., VCT, LVT, or rubber material) can be punched to the desired sizes, then the punched substrate tiles can be edge profiled, and then similarly dimensioned pieces of carpet layer can be attached to a surface of the punched and edge profiled substrate tiles to provide a laminate product tile.

Although the panels, planks, and other building units of the present invention are described herein in the context of flooring applications, they also are suitable for use on other surfaces, for example, walls, ceilings, rooves, or the like. The panels, planks, and other building units of the present invention are adaptable for indoor or outdoor installations. They are suitable for home or commercial use. They can be adapted for use in fixed structures or mobile vehicles. The panels, planks, and other building units of the present invention are enabled for a wide range of applications and environments, heavy, moderate, or light use, as would be understood by one of ordinary skill in art, whether or not explicitly recited herein.

The present invention includes the following aspects/embodiments/features in any order and/or in any combination:

1. The present invention relates to an adhesive-backed flooring panel comprising:
   a flooring panel body comprising a top surface, a bottom surface, and a perimeter edge, and exhibiting a flexural rigidity such that the flooring panel body cannot be rolled-up and the top surface cannot contact the bottom surface; and
   a double-sided adhesive sheet adhered to and covering the bottom surface of the flooring panel body and comprising
   a base sheet having a first surface and a second surface opposite the first surface,
   a first adhesive layer adhered to the bottom surface of the flooring panel body and the first surface of the base sheet, and
   a second adhesive layer having an inner surface and an outer surface opposite the inner surface, wherein the inner surface is adhered to the second surface.
2. The adhesive-backed flooring panel of any preceding or following embodiment/feature/aspect, further comprising a peel-away cover sheet removably attached to the outer surface.
3. The adhesive-backed flooring panel of any preceding or following embodiment/feature/aspect, wherein the peel-away cover sheet comprises a ply-coated kraft liner.
4. The adhesive-backed flooring panel of any preceding or following embodiment/feature/aspect, wherein the outer surface is adhered to a substrate and the substrate comprises a subfloor.
5. The adhesive-backed flooring panel of any preceding or following embodiment/feature/aspect, wherein the double-sided adhesive sheet covers the entire bottom surface of the flooring panel body.
6. The adhesive-backed flooring panel of any preceding or following embodiment/feature/aspect, wherein the flooring panel body comprises a luxury vinyl tile (LVT).
7. The adhesive-backed flooring panel of any preceding or following embodiment/feature/aspect, wherein the flooring panel body comprises wood, wood composite, rubber, ceramic, stone, concrete, metal, fiberglass, plastic, carpeting or any combination thereof.
8. The adhesive-backed flooring panel of any preceding or following embodiment/feature/aspect, wherein the top surface of the flooring panel body comprises an embossed decorative design.
9. The adhesive-backed flooring panel of any preceding or following embodiment/feature/aspect, wherein the first adhesive layer, the second adhesive layer, or both, comprises a dry adhesive.
10. The adhesive-backed flooring panel of any preceding or following embodiment/feature/aspect, wherein the first adhesive layer and the second adhesive layer comprise different chemical compositions.
11. The adhesive-backed flooring panel of any preceding or following embodiment/feature/aspect, wherein the first adhesive layer comprises an emulsion-modified acrylic plasticizer-resistant adhesive.
12. The adhesive-backed flooring panel of any preceding or following embodiment/feature/aspect, wherein the second adhesive layer comprises an emulsion-modified acrylic solvent-resistant adhesive.
13. The adhesive-backed flooring panel of any preceding or following embodiment/feature/aspect, wherein the base sheet comprises a moisture barrier material exhibiting a water vapor permeance of 1 perm or less when tested in accordance with ASTM E96.
14. The adhesive-backed flooring panel of any preceding or following embodiment/feature/aspect, wherein the base sheet comprises a polyester film.
15. The adhesive-backed flooring panel of any preceding or following embodiment/feature/aspect, wherein the bottom surface of the flooring panel body comprises a body proper and an underlayer between the body proper and the double-sided adhesive sheet.
16. The adhesive-backed flooring panel of any preceding or following embodiment/feature/aspect, further comprising an underlayer attached to the outer surface.
17. The adhesive-backed flooring panel of any preceding or following embodiment/feature/aspect, wherein the underlayer comprises a cushioning layer, a thermal insulating layer, a sound insulating layer, a moisture barrier layer, an impact barrier layer, an electrostatic barrier layer, a pest resistant layer, a mold resistant layer, an odor resistant layer, a rigidity layer, a structural reinforcement layer, a magnetic layer, a floating floor engagement layer, a radiant heat engagement layer, a utility access engagement layer, or any combination thereof.
18. A flooring system comprising a plurality of adhesive-backed flooring panels according to any preceding or following embodiment/feature/aspect adhered to a substrate, wherein at least two panels of the plurality are positioned adjacent to one another in a common plane.
19. The flooring system of any preceding or following embodiment/feature/aspect, wherein the adjacent panels contact each other along portions of their respective perimeter edges in a gap-free juxtaposition.
20. A method of installing the flooring system of any preceding or following embodiment/feature/aspect, comprising:
   providing a plurality of adhesive-backed flooring panels according to any preceding or following embodiment/feature/aspect;
   removing the peel-away cover sheet from a first adhesive-backed flooring panel of the plurality;
   adhering the first adhesive-backed flooring panel to the substrate;
   removing a second peel-away cover sheet from a second adhesive-backed flooring panel of the plurality; and
   adhering the second adhesive-backed flooring panel to the substrate adjacent to the first adhesive-backed flooring panel.
21. A method of manufacturing the adhesive-backed flooring panel of any preceding or following embodiment/feature/aspect, the method comprising adhering the first adhesive layer of the double-sided adhesive sheet to the bottom surface of the flooring panel body.
22. The method of any preceding or following embodiment/feature/aspect, wherein the double-sided adhesive sheet comprises a peel-away cover sheet removably attached to the outer surface
23. The method of any preceding or following embodiment/feature/aspect, further comprising cutting the adhesive-backed flooring panel into two or more flooring panel portions after the adhering of the first adhesive sheet layer.
24. The method of any preceding or following embodiment/feature/aspect, further comprising adhering an underlayer to the outer surface, wherein the underlayer has an upper surface and a lower surface, the upper surface adjacent to the outer surface.
25. The method of any preceding or following embodiment/feature/aspect, further comprising adhering an outer double-sided adhesive sheet to the lower surface.

26. The method of any preceding or following embodiment/feature/aspect, wherein the adhering is performed as the flooring panel body travels on a conveyor.

27. The method of any preceding or following embodiment/feature/aspect, further comprising conveying a second flooring panel body following the flooring panel body on the conveyor and adhering a first adhesive layer of a second double-sided adhesive sheet to a bottom surface of the second flooring panel body.

28. The method of any preceding or following embodiment/feature/aspect, wherein the double-sided adhesive sheet and second double-sided adhesive sheet are supplied from a source double-side adhesive sheet having an area sufficient to cover the bottom surfaces of the flooring panel body and second flooring panel body.

29. The method of any preceding or following embodiment/feature/aspect, further comprising cutting the source double-sided adhesive sheet at or proximal a trailing edge of the flooring panel body.

30. A packaged flooring system comprising package holding a plurality of the adhesive-backed flooring panels according to any preceding or following embodiment/feature/aspect, wherein the plurality of panels are stacked on top of one another and parallel to one another.

31. The adhesive-backed flooring panel of any preceding or following embodiment/feature/aspect, wherein the double-sided adhesive sheet has one or more of the following properties:

a) a 90° peel strength after heat aging for 7 days at 50° C./50% relative humidity (RH), as determined in accordance with EN 1372 using a 10 pound roller and a primed fiber-cement board as a substrate attached at the outer surface of the second adhesive layer, of at least 0.3 pounds-force/inch;

b) a 90° peel strength after heat aging for 20 days at 50° C./50% RH, as determined in accordance with EN 1372 using 42 pounds/square inch lamination and a primed fiber-cement board as a substrate attached at the outer surface of the second adhesive layer, of at least 4.5 pounds-force/inch;

c) a 90° peel strength after heat aging for 20 days at 50° C./50% RH, as determined in accordance with EN 1372 using 42 pounds/square inch lamination and an unprimed fiber-cement board as a substrate attached at the outer surface of the second adhesive layer, of at least 6 pounds-force/inch;

d) a 90° peel strength after heat aging for 20 days at 50° C./50% RH, as determined in accordance with EN 1372 using 42 pounds/square inch lamination and a luan board as a substrate attached at the outer surface of the second adhesive layer, of at least 7.5 pounds-force/inch;

e) a 90° peel strength after heat aging for 20 days at 50° C./50% RH, as determined in accordance with EN 1372 using 42 pounds/square inch lamination and plywood as a substrate attached at the outer surface of the second adhesive layer, of at least 5 pounds-force/inch;

f) a 90° peel strength after heat aging for 41 days at 50° C./50% RH, as determined in accordance with EN 1372 using 42 pounds/square inch lamination and a primed fiber-cement board as a substrate attached at the outer surface of the second adhesive layer, of at least 4 pounds-force/inch;

g) a 90° peel strength after heat aging for 41 days at 50° C./50% RH, as determined in accordance with EN 1372 using 42 pounds/square inch lamination and an unprimed fiber-cement board as a substrate attached at the outer surface of the second adhesive layer, of at least 5 pounds-force/inch;

h) a 90° peel strength after heat aging for 41 days at 50° C./50% RH, as determined in accordance with EN 1372 using 42 pounds/square inch lamination and a luan board as a substrate attached at the outer surface of the second adhesive layer, of at least 6 pounds-force/inch;

i) a 90° peel strength after heat aging for 41 days at 50° C./50% RH, as determined in accordance with EN 1372 using 42 pounds/square inch lamination and plywood as a substrate attached at the outer surface of the second adhesive layer, of at least 5 pounds-force/inch;

j) a shear strength after heat aging for 7 days at 50° C./50% RH, as determined in accordance with EN 1373 using a 10 pound roller and a primed fiber-cement board as a substrate attached at the outer surface of the second adhesive layer, of at least 8 pounds-force/square inch;

k) a shear strength after heat aging for 20 days at 50° C./50% RH, as determined in accordance with EN 1373 using 42 pounds/square inch lamination and a primed fiber-cement board as a substrate attached at the outer surface of the second adhesive layer, of at least 20 pounds-force/square inch;

l) a shear strength after heat aging for 20 days at 50° C./50% RH, as determined in accordance with EN 1373 using 42 pounds/square inch lamination and an unprimed fiber-cement board as a substrate attached at the outer surface of the second adhesive layer, of at least 20 pounds-force/square inch;

m) a shear strength after heat aging for 20 days at 50° C./50% RH, as determined in accordance with EN 1373 using 42 pounds/square inch lamination and a luan board as a substrate attached at the outer surface of the second adhesive layer, of at least 30 pounds-force/square inch;

n) a shear strength after heat aging for 20 days at 50° C./50% RH, as determined in accordance with EN 1373 using 42 pounds/square inch lamination and plywood as a substrate attached at the outer surface of the second adhesive layer, of at least 20 pounds-force/square inch;

o) a shear strength after heat aging for 41 days at 50° C./50% RH, as determined in accordance with EN 1373 using 42 pounds/square inch lamination and a primed fiber-cement board as a substrate attached at the outer surface of the second adhesive layer, of at least 4 pounds-force/square inch;

p) a shear strength after heat aging for 41 days at 50° C./50% RH, as determined in accordance with EN 1373 using 42 pounds/square inch lamination and an unprimed fiber-cement board as a substrate attached at the outer surface of the second adhesive layer, of at least 5 pounds-force/square inch;

q) a shear strength after heat aging for 41 days at 50° C./50% RH, as determined in accordance with EN 1373 using 42 pounds/square inch lamination and a luan board as a substrate attached at the outer surface of the second adhesive layer, of at least 6.5 pounds-force/square inch;

r) a shear strength after heat aging for 41 days at 50° C./50% RH, as determined in accordance with EN 1373 using 42 pounds/square inch lamination and plywood as a substrate attached at the outer surface of the second adhesive layer, of at least 5 pounds-force/square inch;

s) a static shear strength, as determined using a portland cement-based polymer-modified underlayment as a substrate attached at the outer surface of the second adhesive layer, that withstands a static shear mode force of 1000 grams at about 23° C. for at least 20 minutes;

t) a static shear strength, as determined using a luan board as a substrate attached at the outer surface of the second adhesive layer, that withstands a static shear mode force of 1000 grams at about 23° C. for at least 15 minutes;

u) a shear bond strength, as measured using an Instron tester with a crosshead speed of 0.5 inch/minute and a portland cement-based polymer-modified underlayment as a substrate attached at the outer surface of the second adhesive layer, of at least 40 pounds-force;

v) a shear bond strength, as measured using an Instron tester with a crosshead speed of 0.5 inch/minute and a luan board as a substrate attached at the outer surface of the second adhesive layer, of at least 54 pounds-force;

w) a shear bond strength, as measured using an Instron tester with a crosshead speed of 0.5 inch/minute and a vinyl board as a substrate attached at the outer surface of the second adhesive layer, of at least 40 pounds-force;

x) a shear bond strength, as measured using an Instron tester with a crosshead speed of 0.5 inch/minute and a primed portland cement-based polymer-modified underlayment as a substrate attached at the outer surface of the second adhesive layer, of at least 37 pounds-force;

y) a shear bond strength, as measured using an Instron tester with a crosshead speed of 0.5 inch/minute and a primed luan board as a substrate attached at the outer surface of the second adhesive layer, of at least 40 pounds-force.

32. The adhesive-backed flooring panel of any preceding or following embodiment/feature/aspect, wherein the double-sided adhesive sheet has one or more of the following properties:

a) a 90° peel strength after heat aging for 7 days at 50° C./50% relative humidity (RH), as determined in accordance with EN 1372 using a 10 pound roller and a primed fiber-cement board as a substrate attached at the outer surface of the second adhesive layer, of from 0.3 to 1.5 pounds-force/inch;

b) a 90° peel strength after heat aging for 20 days at 50° C./50% RH, as determined in accordance with EN 1372 using 42 pounds/square inch lamination and a primed fiber-cement board as a substrate attached at the outer surface of the second adhesive layer, of from 4.5 to 14 pounds-force/inch;

c) a 90° peel strength after heat aging for 20 days at 50° C./50% RH, as determined in accordance with EN 1372 using 42 pounds/square inch lamination and an unprimed fiber-cement board as a substrate attached at the outer surface of the second adhesive layer, of from 6 to 12 pounds-force/inch;

d) a 90° peel strength after heat aging for 20 days at 50° C./50% RH, as determined in accordance with EN 1372 using 42 pounds/square inch lamination and a luan board as a substrate attached at the outer surface of the second adhesive layer, of from 7.5 to 16 pounds-force/inch;

e) a 90° peel strength after heat aging for 20 days at 50° C./50% RH, as determined in accordance with EN 1372 using 42 pounds/square inch lamination and plywood as a substrate attached at the outer surface of the second adhesive layer, of from 5 to 15 pounds-force/inch;

f) a 90° peel strength after heat aging for 41 days at 50° C./50% RH, as determined in accordance with EN 1372 using 42 pounds/square inch lamination and a primed fiber-cement board as a substrate attached at the outer surface of the second adhesive layer, of from 4 to 12 pounds-force/inch;

g) a 90° peel strength after heat aging for 41 days at 50° C./50% RH, as determined in accordance with EN 1372 using 42 pounds/square inch lamination and an unprimed fiber-cement board as a substrate attached at the outer surface of the second adhesive layer, of from 5 to 10 pounds-force/inch;

h) a 90° peel strength after heat aging for 41 days at 50° C./50% RH, as determined in accordance with EN 1372 using 42 pounds/square inch lamination and a luan board as a substrate attached at the outer surface of the second adhesive layer, of from 6 to 15 pounds-force/inch;

i) a 90° peel strength after heat aging for 41 days at 50° C./50% RH, as determined in accordance with EN 1372 using 42 pounds/square inch lamination and plywood as a substrate attached at the outer surface of the second adhesive layer, of from 5 to 12 pounds-force/inch;

j) a shear strength after heat aging for 7 days at 50° C./50% RH, as determined in accordance with EN 1373 using a 10 pound roller and a primed fiber-cement board as a substrate attached at the outer surface of the second adhesive layer, of from 8 to 16 pounds-force/square inch;

k) a shear strength after heat aging for 20 days at 50° C./50% RH, as determined in accordance with EN 1373 using 42 pounds/square inch lamination and a primed fiber-cement board as a substrate attached at the outer surface of the second adhesive layer, of from 20 to 50 pounds-force/square inch;

l) a shear strength after heat aging for 20 days at 50° C./50% RH, as determined in accordance with EN 1373 using 42 pounds/square inch lamination and an unprimed fiber-cement board as a substrate attached at the outer surface of the second adhesive layer, of from 20 to 40 pounds-force/square inch;

m) a shear strength after heat aging for 20 days at 50° C./50% RH, as determined in accordance with EN 1373 using 42 pounds/square inch lamination and a luan board as a substrate attached at the outer surface of the second adhesive layer, of from 30 to 55 pounds-force/square inch;

n) a shear strength after heat aging for 20 days at 50° C./50% RH, as determined in accordance with EN 1373 using 42 pounds/square inch lamination and plywood as a substrate attached at the outer surface of the second adhesive layer, of from 20 to 60 pounds-force/square inch;

o) a shear strength after heat aging for 41 days at 50° C./50% RH, as determined in accordance with EN 1373 using 42 pounds/square inch lamination and a primed fiber-cement board as a substrate attached at the outer surface of the second adhesive layer, of from 4 to 10 pounds-force/square inch;

p) a shear strength after heat aging for 41 days at 50° C./50% RH, as determined in accordance with EN 1373 using 42 pounds/square inch lamination and an unprimed fiber-cement board as a substrate attached at the outer surface of the second adhesive layer, of from 5 to 10 pounds-force/square inch;

q) a shear strength after heat aging for 41 days at 50° C./50% RH, as determined in accordance with EN 1373 using 42 pounds/square inch lamination and a luau board as a substrate attached at the outer surface of the second adhesive layer, of from 6.5 to 15 pounds-force/square inch;

r) a shear strength after heat aging for 41 days at 50° C./50% RH, as determined in accordance with EN 1373 using 42 pounds/square inch lamination and plywood as a substrate attached at the outer surface of the second adhesive layer, of from 5 to 12 pounds-force/square inch;

s) a static shear strength, as determined using a portland cement-based polymer-modified underlayment as a substrate attached at the outer surface of the second adhesive layer, that withstands a static shear mode force of 1000 grams at about 23° C. for at least 25 minutes;

t) a static shear strength, as determined using a luan board as a substrate attached at the outer surface of the second adhesive layer, that withstands a static shear mode force of 1000 grams at about 23° C. for at least 17.5 minutes;

u) a shear bond strength, as measured using an Instron tester with a crosshead speed of 0.5 inch/minute and a portland cement-based polymer-modified underlayment as a substrate attached at the outer surface of the second adhesive layer, of from 40 to 80 pounds-force;

v) a shear bond strength, as measured using an Instron tester with a crosshead speed of 0.5 inch/minute and a luan board as a substrate attached at the outer surface of the second adhesive layer, of from 54 to 80 pounds-force;

w) a shear bond strength, as measured using an Instron tester with a crosshead speed of 0.5 inch/minute and a vinyl board as a substrate attached at the outer surface of the second adhesive layer, of from 40 to 60 pounds-force;

x) a shear bond strength, as measured using an Instron tester with a crosshead speed of 0.5 inch/minute and a primed portland cement-based polymer-modified underlayment as a substrate attached at the outer surface of the second adhesive layer, of from 37 to 85 pounds-force;

y) a shear bond strength, as measured using an Instron tester with a crosshead speed of 0.5 inch/minute and a primed luan board as a substrate attached at the outer surface of the second adhesive layer, of from 40 to 65 pounds-force.

33. The adhesive-backed flooring panel of any preceding or following embodiment/feature/aspect, wherein 90° peel strength of the second adhesive layer to 90° peel strength of the first adhesive layer is in a ratio range of from 1.1:1 to 5:1, wherein the 90° peel strengths of the first and second adhesive layers are obtained in accordance with EN 1372 using the same aging, lamination, and substrate materials.

34. The adhesive-backed flooring panel of any preceding or following embodiment/feature/aspect, wherein 90° peel strength of the second adhesive layer to 90° peel strength of the first adhesive layer is in a ratio range of from 1.2:1 to 4:1, wherein the 90° peel strengths of the first and second adhesive layers are obtained in accordance with EN 1372 using the same aging, lamination, and substrate materials.

The present invention can include any combination of these various features or embodiments above and/or below as set forth in sentences and/or paragraphs. Any combination of disclosed features herein is considered part of the present invention and no limitation is intended with respect to combinable features.

The entire contents of all cited references in this disclosure are incorporated herein. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. An adhesive-backed flooring panel comprising:
a flooring panel body comprising a) one or more base layers containing a polymer material and a filler, wherein the polymer material comprises a thermoplastic polymer, a thermoset polymer, or blends of polymers, and said flooring panel having a top surface, a bottom surface, and a perimeter edge, and exhibiting a flexural rigidity such that the flooring panel body cannot be rolled-up and the top surface cannot contact the bottom surface and said adhesive-backed flooring panel body having a cross-sectional area; and
b) a double-sided adhesive sheet adhered to and covering the bottom surface of the flooring panel body and comprising
a base sheet having a first surface and a second surface opposite the first surface, wherein the base sheet comprises a moisture barrier material exhibiting a water vapor permeance of 1 perm or less when tested in accordance with ASTM E96,
a first adhesive layer adhered to the bottom surface of the flooring panel body and the first surface of the base sheet, and
a second adhesive layer having an inner surface and an outer surface opposite the inner surface, wherein the inner surface is adhered to the second surface,
wherein the first adhesive layer, the second adhesive layer, or both, comprises a dry adhesive and wherein a thickness of the double-sided adhesive sheet is not greater than 300 microns and wherein the double-sided adhesive sheet covers at least 90% of the cross-sectional area of the bottom surface of the flooring panel body, and wherein said adhesive-backed flooring panel is in the absence of any mechanical fasteners and tongue/grooves.

2. The adhesive-backed flooring panel of claim 1, further comprising a peel-away cover sheet removably attached to the outer surface.

3. The adhesive-backed flooring panel of claim 2, wherein the peel-away cover sheet comprises a ply-coated kraft liner.

4. A packaged flooring system comprising package holding a plurality of the adhesive-backed flooring panels according to claim 2, wherein the plurality of panels are stacked on top of one another and parallel to one another.

5. The adhesive-backed flooring panel of claim 1, wherein the outer surface is adhered to a substrate and the substrate comprises a subfloor.

6. The adhesive-backed flooring panel of claim 1, wherein the double-sided adhesive sheet covers the entire bottom surface of the flooring panel body.

7. The adhesive-backed flooring panel of claim 1, wherein the flooring panel body is a luxury vinyl tile (LVT).

8. The adhesive-backed flooring panel of claim 1, wherein the flooring panel body is rubber flooring panel.

9. The adhesive-backed flooring panel of claim 1, wherein the top surface of the flooring panel body comprises an embossed decorative design.

10. The adhesive-backed flooring panel of claim 1, wherein the first adhesive layer and the second adhesive layer comprise different chemical compositions, provided at least one of the first adhesive layer and the second adhesive layer comprises a dry adhesive.

11. The adhesive-backed flooring panel of claim 1, wherein the first adhesive layer comprises an emulsion-modified acrylic plasticizer-resistant adhesive.

12. The adhesive-backed flooring panel of claim 1, wherein the second adhesive layer comprises an emulsion-modified acrylic solvent-resistant adhesive.

13. The adhesive-backed flooring panel of claim 1, wherein the base sheet comprises a polyester film.

14. The adhesive-backed flooring panel of claim 1, wherein the bottom surface of the flooring panel body comprises a body proper and an underlayer between the body proper and the double-sided adhesive sheet.

15. The adhesive-backed flooring panel of claim 1, further comprising an underlayer attached to the outer surface.

16. The adhesive-backed flooring panel of claim 15, wherein the underlayer comprises a cushioning layer, a thermal insulating layer, a sound insulating layer, a moisture barrier layer, an impact barrier layer, an electrostatic barrier layer, a pest resistant layer, a mold resistant layer, an odor resistant layer, a rigidity layer, a structural reinforcement layer, a magnetic layer, a floating floor engagement layer, a radiant heat engagement layer, a utility access engagement layer, or any combination thereof.

17. A flooring system comprising a plurality of adhesive-backed flooring panels according to claim 1 adhered to a substrate, wherein at least two panels of the plurality are positioned adjacent to one another in a common plane and in the absence of any mechanical fasteners or tongue/groove system.

18. The flooring system of claim 17, wherein the adjacent panels contact each other along portions of their respective perimeter edges in a gap-free juxtaposition.

19. A method of installing the flooring system of claim 17, comprising:
providing a plurality of adhesive-backed flooring panels;
removing the peel-away cover sheet from a first adhesive-backed flooring panel of the plurality;
adhering the first adhesive-backed flooring panel to the substrate;
removing a second peel-away cover sheet from a second adhesive-backed flooring panel of the plurality; and
adhering the second adhesive-backed flooring panel to the substrate adjacent to the first adhesive-backed flooring panel, and wherein said installing is in the absence of any mechanical fasteners or tongue/groove system.

20. A method of manufacturing the adhesive-backed flooring panel of claim 1, the method comprising adhering the first adhesive layer of the double-sided adhesive sheet to the bottom surface of the flooring panel body.

21. The method of claim 20, wherein the double-sided adhesive sheet comprises a peel-away cover sheet removably attached to the outer surface.

22. The method of claim 20, further comprising cutting the adhesive-backed flooring panel into two or more flooring panel portions after the adhering of the first adhesive sheet layer.

23. The method of claim 20, further comprising adhering an underlayer to the outer surface, wherein the underlayer has an upper surface and a lower surface, the upper surface adjacent to the outer surface.

24. The method of claim 23, further comprising adhering an outer double-sided adhesive sheet to the lower surface.

25. The method of claim 20, wherein the adhering is performed as the flooring panel body travels on a conveyor.

26. The method of claim 25, further comprising conveying a second flooring panel body following the flooring panel body on the conveyor and adhering a first adhesive layer of a second double-sided adhesive sheet to a bottom surface of the second flooring panel body.

27. The method of claim 26, wherein the double-sided adhesive sheet and second double-sided adhesive sheet are supplied from a source double-side adhesive sheet having an area sufficient to cover the bottom surfaces of the flooring panel body and second flooring panel body.

28. The method of claim 27, further comprising cutting the source double-sided adhesive sheet at or proximal a trailing edge of the flooring panel body.

29. The adhesive-backed flooring panel of claim 1, wherein the double-sided adhesive sheet has one or more of the following properties:
a) a 90° peel strength after heat aging for 7 days at 50° C./50% relative humidity (RH), as determined in accordance with EN 1372 using a 10 pound roller and a primed fiber-cement board as a substrate attached at the outer surface of the second adhesive layer, of at least 0.3 pounds-force/inch;
b) a 90° peel strength after heat aging for 20 days at 50° C./50% RH, as determined in accordance with EN 1372 using 42 pounds/square inch lamination and a primed fiber-cement board as a substrate attached at the outer surface of the second adhesive layer, of at least 4.5 pounds-force/inch;
c) a 90° peel strength after heat aging for 20 days at 50° C./50% RH, as determined in accordance with EN 1372 using 42 pounds/square inch lamination and an unprimed fiber-cement board as a substrate attached at the outer surface of the second adhesive layer, of at least 6 pounds-force/inch;
d) a 90° peel strength after heat aging for 20 days at 50° C./50% RH, as determined in accordance with EN 1372 using 42 pounds/square inch lamination and a luan board as a substrate attached at the outer surface of the second adhesive layer, of at least 7.5 pounds-force/inch;
e) a 90° peel strength after heat aging for 20 days at 50° C./50% RH, as determined in accordance with EN 1372 using 42 pounds/square inch lamination and plywood as a substrate attached at the outer surface of the second adhesive layer, of at least 5 pounds-force/inch;
f) a 90° peel strength after heat aging for 41 days at 50° C./50% RH, as determined in accordance with EN 1372 using 42 pounds/square inch lamination and a primed fiber-cement board as a substrate attached at the outer surface of the second adhesive layer, of at least 4 pounds-force/inch;
g) a 90° peel strength after heat aging for 41 days at 50° C./50% RH, as determined in accordance with EN 1372 using 42 pounds/square inch lamination and an unprimed fiber-cement board as a substrate attached at the outer surface of the second adhesive layer, of at least 5 pounds-force/inch;
h) a 90° peel strength after heat aging for 41 days at 50° C./50% RH, as determined in accordance with EN 1372 using 42 pounds/square inch lamination and a luan board as a substrate attached at the outer surface of the second adhesive layer, of at least 6 pounds-force/inch;
i) a 90° peel strength after heat aging for 41 days at 50° C./50% RH, as determined in accordance with EN 1372 using 42 pounds/square inch lamination and plywood as a substrate attached at the outer surface of the second adhesive layer, of at least 5 pounds-force/inch;
j) a shear strength after heat aging for 7 days at 50° C./50% RH, as determined in accordance with EN 1373 using a 10 pound roller and a primed fiber-cement board as a substrate attached at the outer surface of the second adhesive layer, of at least 8 pounds-force/square inch;

k) a shear strength after heat aging for 20 days at 50° C./50% RH, as determined in accordance with EN 1373 using 42 pounds/square inch lamination and a primed fiber-cement board as a substrate attached at the outer surface of the second adhesive layer, of at least 20 pounds-force/square inch;

l) a shear strength after heat aging for 20 days at 50° C./50% RH, as determined in accordance with EN 1373 using 42 pounds/square inch lamination and an unprimed fiber-cement board as a substrate attached at the outer surface of the second adhesive layer, of at least 20 pounds-force/square inch;

m) a shear strength after heat aging for 20 days at 50° C./50% RH, as determined in accordance with EN 1373 using 42 pounds/square inch lamination and a luan board as a substrate attached at the outer surface of the second adhesive layer, of at least 30 pounds-force/square inch;

n) a shear strength after heat aging for 20 days at 50° C./50% RH, as determined in accordance with EN 1373 using 42 pounds/square inch lamination and plywood as a substrate attached at the outer surface of the second adhesive layer, of at least 20 pounds-force/square inch;

o) a shear strength after heat aging for 41 days at 50° C./50% RH, as determined in accordance with EN 1373 using 42 pounds/square inch lamination and a primed fiber-cement board as a substrate attached at the outer surface of the second adhesive layer, of at least 4 pounds-force/square inch;

p) a shear strength after heat aging for 41 days at 50° C./50% RH, as determined in accordance with EN 1373 using 42 pounds/square inch lamination and an unprimed fiber-cement board as a substrate attached at the outer surface of the second adhesive layer, of at least 5 pounds-force/square inch;

q) a shear strength after heat aging for 41 days at 50° C./50% RH, as determined in accordance with EN 1373 using 42 pounds/square inch lamination and a luan board as a substrate attached at the outer surface of the second adhesive layer, of at least 6.5 pounds-force/square inch;

r) a shear strength after heat aging for 41 days at 50° C./50% RH, as determined in accordance with EN 1373 using 42 pounds/square inch lamination and plywood as a substrate attached at the outer surface of the second adhesive layer, of at least 5 pounds-force/square inch;

s) a static shear strength, as determined using a portland cement-based polymer-modified underlayment as a substrate attached at the outer surface of the second adhesive layer, that withstands a static shear mode force of 1000 grams at about 23° C. for at least 20 minutes;

t) a static shear strength, as determined using a luan board as a substrate attached at the outer surface of the second adhesive layer, that withstands a static shear mode force of 1000 grams at about 23° C. for at least 15 minutes;

u) a shear bond strength, as measured using an Instron tester with a crosshead speed of 0.5 inch/minute and a portland cement-based polymer-modified underlayment as a substrate attached at the outer surface of the second adhesive layer, of at least 40 pounds-force;

v) a shear bond strength, as measured using an Instron tester with a crosshead speed of 0.5 inch/minute and a luan board as a substrate attached at the outer surface of the second adhesive layer, of at least 54 pounds-force;

w) a shear bond strength, as measured using an Instron tester with a crosshead speed of 0.5 inch/minute and a vinyl board as a substrate attached at the outer surface of the second adhesive layer, of at least 40 pounds-force;

x) a shear bond strength, as measured using an Instron tester with a crosshead speed of 0.5 inch/minute and a primed portland cement-based polymer-modified underlayment as a substrate attached at the outer surface of the second adhesive layer, of at least 37 pounds-force;

y) a shear bond strength, as measured using an Instron tester with a crosshead speed of 0.5 inch/minute and a primed luan board as a substrate attached at the outer surface of the second adhesive layer, of at least 40 pounds-force.

30. The adhesive-backed flooring panel of claim 1, wherein the double-sided adhesive sheet has one or more of the following properties:

a) a 90° peel strength after heat aging for 7 days at 50° C./50% relative humidity (RH), as determined in accordance with EN 1372 using a 10 pound roller and a primed fiber-cement board as a substrate attached at the outer surface of the second adhesive layer, of from 0.3 to 1.5 pounds-force/inch;

b) a 90° peel strength after heat aging for 20 days at 50° C./50% RH, as determined in accordance with EN 1372 using 42 pounds/square inch lamination and a primed fiber-cement board as a substrate attached at the outer surface of the second adhesive layer, of from 4.5 to 14 pounds-force/inch;

c) a 90° peel strength after heat aging for 20 days at 50° C./50% RH, as determined in accordance with EN 1372 using 42 pounds/square inch lamination and an unprimed fiber-cement board as a substrate attached at the outer surface of the second adhesive layer, of from 6 to 12 pounds-force/inch;

d) a 90° peel strength after heat aging for 20 days at 50° C./50% RH, as determined in accordance with EN 1372 using 42 pounds/square inch lamination and a luan board as a substrate attached at the outer surface of the second adhesive layer, of from 7.5 to 16 pounds-force/inch;

e) a 90° peel strength after heat aging for 20 days at 50° C./50% RH, as determined in accordance with EN 1372 using 42 pounds/square inch lamination and plywood as a substrate attached at the outer surface of the second adhesive layer, of from 5 to 15 pounds-force/inch;

f) a 90° peel strength after heat aging for 41 days at 50° C./50% RH, as determined in accordance with EN 1372 using 42 pounds/square inch lamination and a primed fiber-cement board as a substrate attached at the outer surface of the second adhesive layer, of from 4 to 12 pounds-force/inch;

g) a 90° peel strength after heat aging for 41 days at 50° C./50% RH, as determined in accordance with EN 1372 using 42 pounds/square inch lamination and an unprimed fiber-cement board as a substrate attached at the outer surface of the second adhesive layer, of from 5 to 10 pounds-force/inch;

h) a 90° peel strength after heat aging for 41 days at 50° C./50% RH, as determined in accordance with EN 1372 using 42 pounds/square inch lamination and a luan board as a substrate attached at the outer surface of the second adhesive layer, of from 6 to 15 pounds-force/inch;

i) a 90° peel strength after heat aging for 41 days at 50° C./50% RH, as determined in accordance with EN 1372 using 42 pounds/square inch lamination and plywood as a substrate attached at the outer surface of the second adhesive layer, of from 5 to 12 pounds-force/inch;

j) a shear strength after heat aging for 7 days at 50° C./50% RH, as determined in accordance with EN 1373 using a 10 pound roller and a primed fiber-cement board as a substrate attached at the outer surface of the second adhesive layer, of from 8 to 16 pounds-force/square inch;

k) a shear strength after heat aging for 20 days at 50° C./50% RH, as determined in accordance with EN 1373 using 42 pounds/square inch lamination and a primed fiber-cement board as a substrate attached at the outer surface of the second adhesive layer, of from 20 to 50 pounds-force/square inch;

l) a shear strength after heat aging for 20 days at 50° C./50% RH, as determined in accordance with EN 1373 using 42 pounds/square inch lamination and an unprimed fiber-cement board as a substrate attached at the outer surface of the second adhesive layer, of from 20 to 40 pounds-force/square inch;

m) a shear strength after heat aging for 20 days at 50° C./50% RH, as determined in accordance with EN 1373 using 42 pounds/square inch lamination and a luan board as a substrate attached at the outer surface of the second adhesive layer, of from 30 to 55 pounds-force/square inch;

n) a shear strength after heat aging for 20 days at 50° C./50% RH, as determined in accordance with EN 1373 using 42 pounds/square inch lamination and plywood as a substrate attached at the outer surface of the second adhesive layer, of from 20 to 60 pounds-force/square inch;

o) a shear strength after heat aging for 41 days at 50° C./50% RH, as determined in accordance with EN 1373 using 42 pounds/square inch lamination and a primed fiber-cement board as a substrate attached at the outer surface of the second adhesive layer, of from 4 to 10 pounds-force/square inch;

p) a shear strength after heat aging for 41 days at 50° C./50% RH, as determined in accordance with EN 1373 using 42 pounds/square inch lamination and an unprimed fiber-cement board as a substrate attached at the outer surface of the second adhesive layer, of from 5 to 10 pounds-force/square inch;

q) a shear strength after heat aging for 41 days at 50° C./50% RH, as determined in accordance with EN 1373 using 42 pounds/square inch lamination and a luan board as a substrate attached at the outer surface of the second adhesive layer, of from 6.5 to 15 pounds-force/square inch;

r) a shear strength after heat aging for 41 days at 50° C./50% RH, as determined in accordance with EN 1373 using 42 pounds/square inch lamination and plywood as a substrate attached at the outer surface of the second adhesive layer, of from 5 to 12 pounds-force/square inch;

s) a static shear strength, as determined using a portland cement-based polymer-modified underlayment as a substrate attached at the outer surface of the second adhesive layer, that withstands a static shear mode force of 1000 grams at about 23° C. for at least 25 minutes;

t) a static shear strength, as determined using a luan board as a substrate attached at the outer surface of the second adhesive layer, that withstands a static shear mode force of 1000 grams at about 23° C. for at least 17.5 minutes;

u) a shear bond strength, as measured using an Instron tester with a crosshead speed of 0.5 inch/minute and a portland cement-based polymer-modified underlayment as a substrate attached at the outer surface of the second adhesive layer, of from 40 to 80 pounds-force;

v) a shear bond strength, as measured using an Instron tester with a crosshead speed of 0.5 inch/minute and a luan board as a substrate attached at the outer surface of the second adhesive layer, of from 54 to 80 pounds-force;

w) a shear bond strength, as measured using an Instron tester with a crosshead speed of 0.5 inch/minute and a vinyl board as a substrate attached at the outer surface of the second adhesive layer, of from 40 to 60 pounds-force;

x) a shear bond strength, as measured using an Instron tester with a crosshead speed of 0.5 inch/minute and a primed portland cement-based polymer-modified underlayment as a substrate attached at the outer surface of the second adhesive layer, of from 37 to 85 pounds-force;

y) a shear bond strength, as measured using an Instron tester with a crosshead speed of 0.5 inch/minute and a primed luan board as a substrate attached at the outer surface of the second adhesive layer, of from 40 to 65 pounds-force.

31. The adhesive-backed flooring panel of claim 1, wherein 90° peel strength of the second adhesive layer to 90° peel strength of the first adhesive layer is in a ratio range of from 1.1:1 to 5:1, wherein the 90° peel strengths of the first and second adhesive layers are obtained in accordance with EN 1372 using the same aging, lamination, and substrate materials.

32. The adhesive-backed flooring panel of claim 1, wherein 90° peel strength of the second adhesive layer to 90° peel strength of the first adhesive layer is in a ratio range of from 1.2:1 to 4:1, wherein the 90° peel strengths of the first and second adhesive layers are obtained in accordance with EN 1372 using the same aging, lamination, and substrate materials.

* * * * *